(12) United States Patent
Young

(10) Patent No.: US 7,912,771 B2
(45) Date of Patent: Mar. 22, 2011

(54) FINANCIAL PLANNING DOCUMENT AND PROCESS THEREFOR

(76) Inventor: Robert A. Young, Woodland, CA (US)

( * ) Notice: Subject to any disclaimer, the term of this patent is extended or adjusted under 35 U.S.C. 154(b) by 660 days.

(21) Appl. No.: 11/419,943

(22) Filed: May 23, 2006

(65) Prior Publication Data

US 2006/0271463 A1   Nov. 30, 2006

Related U.S. Application Data

(60) Provisional application No. 60/683,940, filed on May 24, 2005.

(51) Int. Cl.
G06Q 40/00 (2006.01)
(52) U.S. Cl. .................. 705/35; 705/36 R; 705/38
(58) Field of Classification Search .................. 235/379; 705/39, 4

See application file for complete search history.

(56) References Cited

U.S. PATENT DOCUMENTS

| | | | | |
|---|---|---|---|---|
| 5,093,787 | A * | 3/1992 | Simmons | 705/33 |
| 5,754,980 | A * | 5/1998 | Anderson et al. | 705/4 |
| 5,875,437 | A * | 2/1999 | Atkins | 705/40 |
| 5,878,405 | A * | 3/1999 | Grant et al. | 705/39 |
| 5,884,283 | A | 3/1999 | Manos | |
| 5,960,415 | A | 9/1999 | Williams | |
| 6,058,376 | A * | 5/2000 | Crockett | 705/35 |
| 6,249,770 | B1 | 6/2001 | Erwin et al. | |
| 6,253,192 | B1 * | 6/2001 | Corlett et al. | 705/36 R |
| 6,298,334 | B1 * | 10/2001 | Burfield et al. | 705/36 R |
| 6,397,195 | B1 | 5/2002 | Pinard et al. | |
| 6,430,542 | B1 | 8/2002 | Moran | |
| 6,611,807 | B1 * | 8/2003 | Bernheim et al. | 705/36 R |
| 6,651,055 | B1 | 11/2003 | Kilmer et al. | |
| 6,801,926 | B1 | 10/2004 | Shisler et al. | |
| 7,236,985 | B2 * | 6/2007 | Brecher | 707/104.1 |

(Continued)

OTHER PUBLICATIONS

Minutes of the 73rd Annual Meeting of Galveston Government Employees Credit Union, Feb. 9, 2006 (BSheet).*

(Continued)

*Primary Examiner* — James P Trammell
*Assistant Examiner* — Chika Ojiaku
(74) *Attorney, Agent, or Firm* — DLA Piper LLP (US)

(57) ABSTRACT

A computer program that can be installed on a web server to assemble web pages that can be accessed over the Internet by password to prepare financial planning reports for a client. The program takes gross income, subtracts income taxes, subtracts all money put into savings programs, and whatever is left is what the client spends in a given year or month. It further itemizes and subtracts the monthly payments for debt service since these items will be fully amortized or paid off at some point in the future and should not be included in baseline living expenses that will continue through a person's lifetime. The balance left after these calculations are completed represents the individual's current annual living expenses or standard of living that needs to be sustained throughout their lifetime with adjustments for inflation. The program can produce three major reports: (1) an income and expense report; (2) an asset and liability report or balance sheet; and (3) a cash flow report that shows all of items that impact cash flow on a year by year basis throughout the rest of the individual or client's lifetime. If there are cash flow shortfalls in any year, the program uses a two step present value calculation to determine how much the individual would need in a lump sum today or contribute monthly or annually to provide sufficient funds in the year needed to fill the shortfall.

28 Claims, 34 Drawing Sheets

U.S. PATENT DOCUMENTS

| | | | |
|---|---|---|---|
| 7,328,183 B1* | 2/2008 | Leisle | 705/36 T |
| 7,398,241 B2* | 7/2008 | Fay et al. | 705/36 R |
| 7,454,379 B1* | 11/2008 | Wolzenski et al. | 705/37 |
| 7,469,228 B2* | 12/2008 | Bonissone et al. | 705/36 R |
| 7,542,932 B2* | 6/2009 | Chalermkraivuth et al. | 705/35 |
| 7,593,880 B2* | 9/2009 | Chalermkraivuth et al. | 705/36 R |
| 2001/0014873 A1* | 8/2001 | Henderson et al. | 705/35 |
| 2002/0042751 A1 | 4/2002 | Sarno | |
| 2002/0073005 A1 | 6/2002 | Welnicki et al. | |
| 2002/0082862 A1 | 6/2002 | Kelley et al. | |
| 2002/0082965 A1 | 6/2002 | Loeper | |
| 2002/0123949 A1* | 9/2002 | VanLeeuwen | 705/35 |
| 2002/0188536 A1 | 12/2002 | Milosavljevic et al. | |
| 2003/0023580 A1 | 1/2003 | Braud et al. | |
| 2003/0028466 A1* | 2/2003 | Jenson et al. | 705/36 |
| 2003/0074211 A1 | 4/2003 | Lun | |
| 2003/0144938 A1 | 7/2003 | Lahre et al. | |
| 2003/0212615 A1 | 11/2003 | Whitehead, Jr. et al. | |
| 2004/0064331 A1 | 4/2004 | Mayer et al. | |
| 2004/0073477 A1 | 4/2004 | Heyns et al. | |
| 2004/0128227 A1* | 7/2004 | Whipple et al. | 705/38 |
| 2004/0148233 A1 | 7/2004 | Lee | |
| 2004/0215551 A1 | 10/2004 | Eder | |
| 2004/0230508 A1 | 11/2004 | Minnis, Jr. et al. | |
| 2004/0267651 A1 | 12/2004 | Jenson et al. | |
| 2005/0004856 A1* | 1/2005 | Brose et al. | 705/35 |
| 2005/0010510 A1* | 1/2005 | Brose et al. | 705/35 |
| 2005/0102212 A1 | 5/2005 | Roy | |
| 2005/0144188 A1 | 6/2005 | Bailey et al. | |
| 2005/0154628 A1 | 7/2005 | Eckart et al. | |
| 2007/0061237 A1* | 3/2007 | Merton et al. | 705/36 R |

OTHER PUBLICATIONS

Rich, Jason R. Make Your Paycheck Last How to Create a Budget you can live with, Who Wanto Be a Millionaire? I Do! Paycheck Chapter 1—http://books.google.com.*

Business Wire, Jan. 25, 2005, Webster Reports Fourth Quarter Earnings and Completion of Balance Sheet Restructuring; Net Interest Margin Improves 19 Basis Points (BalSheet).*

John Ameriks, Using Retirement Planning Software to Assess Americans' Preparedness for Retirement: An Update, Benefits Quarterly, Fourth Quarter Dec. 2000 p. 37-51 (BenefitsQ).*

Simon R and Netzer, B, Making your savings grow safely, Money: May 92 vol. 21 Issue 5 p. 106 (Savings).*

Murray Dropkin, Having it When You Need It: Better Cash Flow Management, ASAE & the Center for Associatilon Leadership, Jun. 2003 (Cashflow).*

Microsoft Great Plains Business Solutions—eEnterprise Financial Series—"Superior Financial Management, Information and Analysis for Your Entire Organization" (2001) (19 pgs.).

WebCPA Tools and Resources for the Electronic Accountant—"New and Updated Tools for Estate and Retirement Plans" by Dave McClure, Jul. 21, 2005 (9 pgs.) (www.webcpa.com).

"Financial Management System Updates", Sep. 2003 (10 pgs.).

HighlineMedia—"Advising Boomers" by Sheryl Garrett, Mar. 2006 (3 pgs.).

PCT International Preliminary Report on Patentability mailed on Dec. 13, 2007 regarding PCT/US2006/20387 filed on May 24, 2006, (9 pgs.).

PCT International Search Report and Written Opinion of the International Searching Authority mailed on Aug. 15, 2007 regarding PCT/US2006/20387 filed on May 24, 2006, (12 pgs.).

Money Tree Software brochure with Silver Financial Planner order form, Jun. 23, 2004 (6 pgs.) (www.moneytree.com).

Money Tree Software—TOTAL Planning System—"Golden Years", Mar. 10, 2005 (90 pgs.) (info@moneytree.com).

Money Tree Software—"Silver Financial Planner", Mar. 30, 2005 (48 pgs.) (info@moneytree.com).

Retirement and College Plan prepared for: Larry & Kelly Examplel, Mar. 1, 2005 (38 pgs.).

* cited by examiner

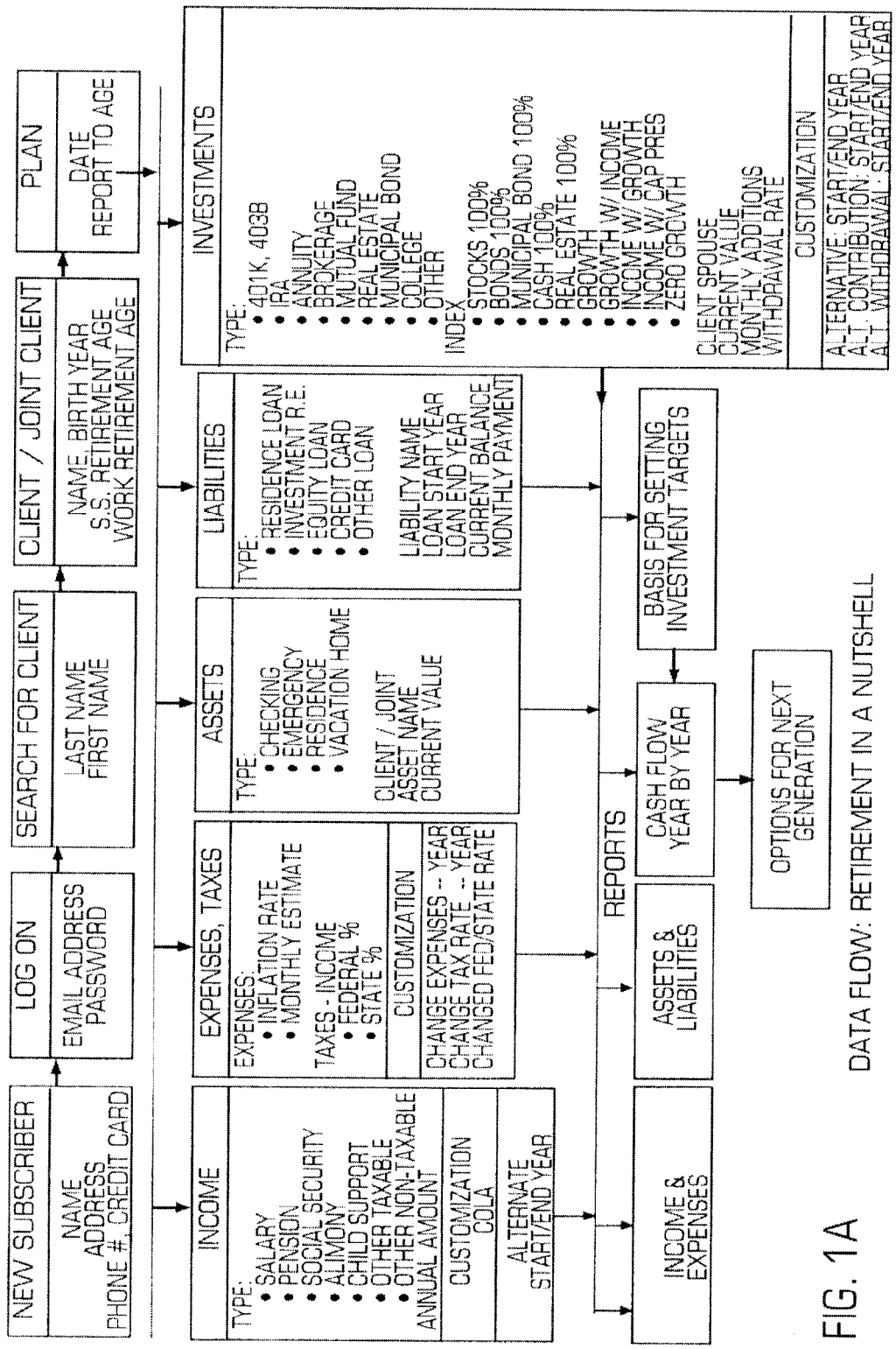
FIG. 1A  DATA FLOW: RETIREMENT IN A NUTSHELL

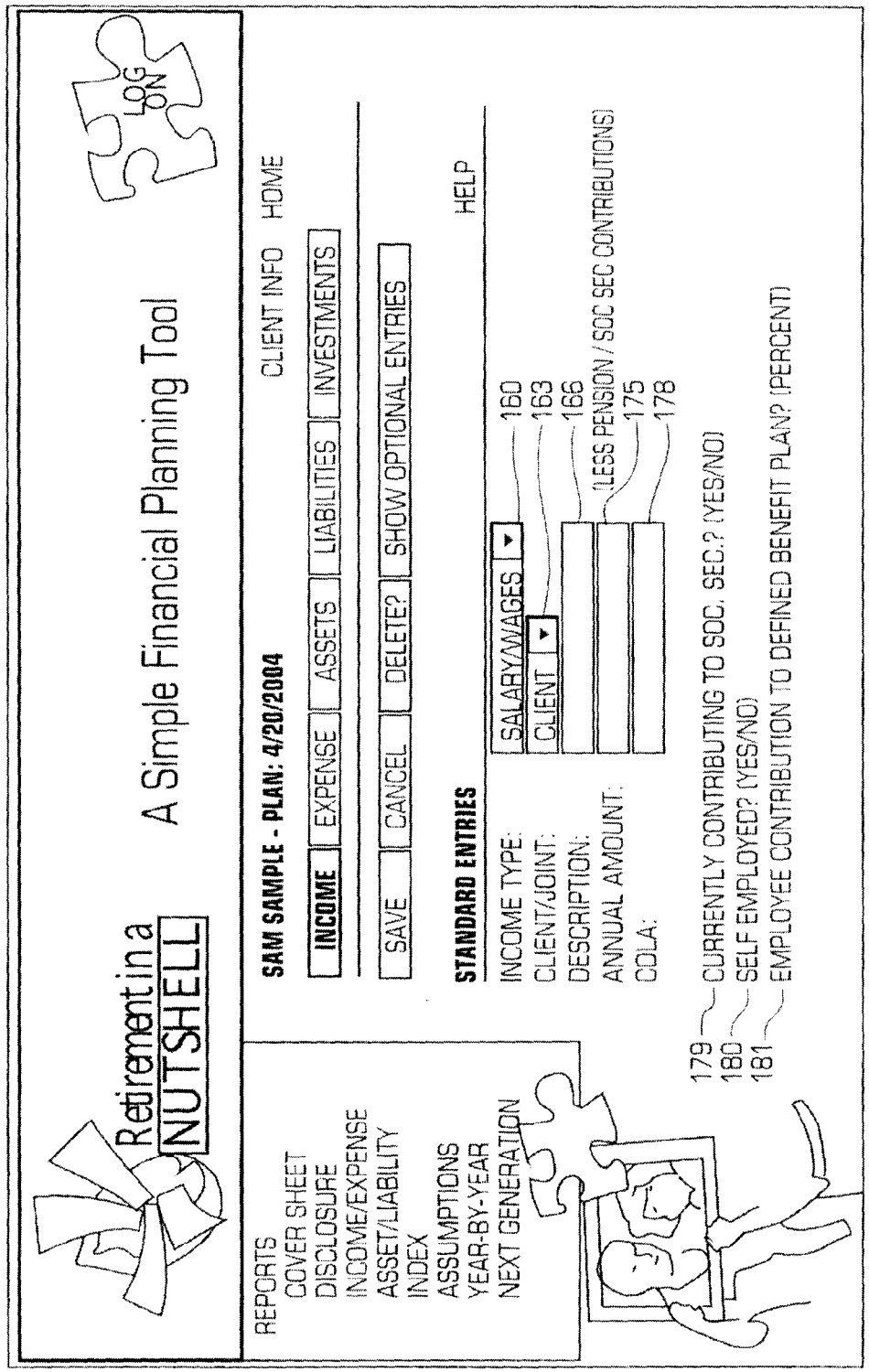
FIG. 2C1

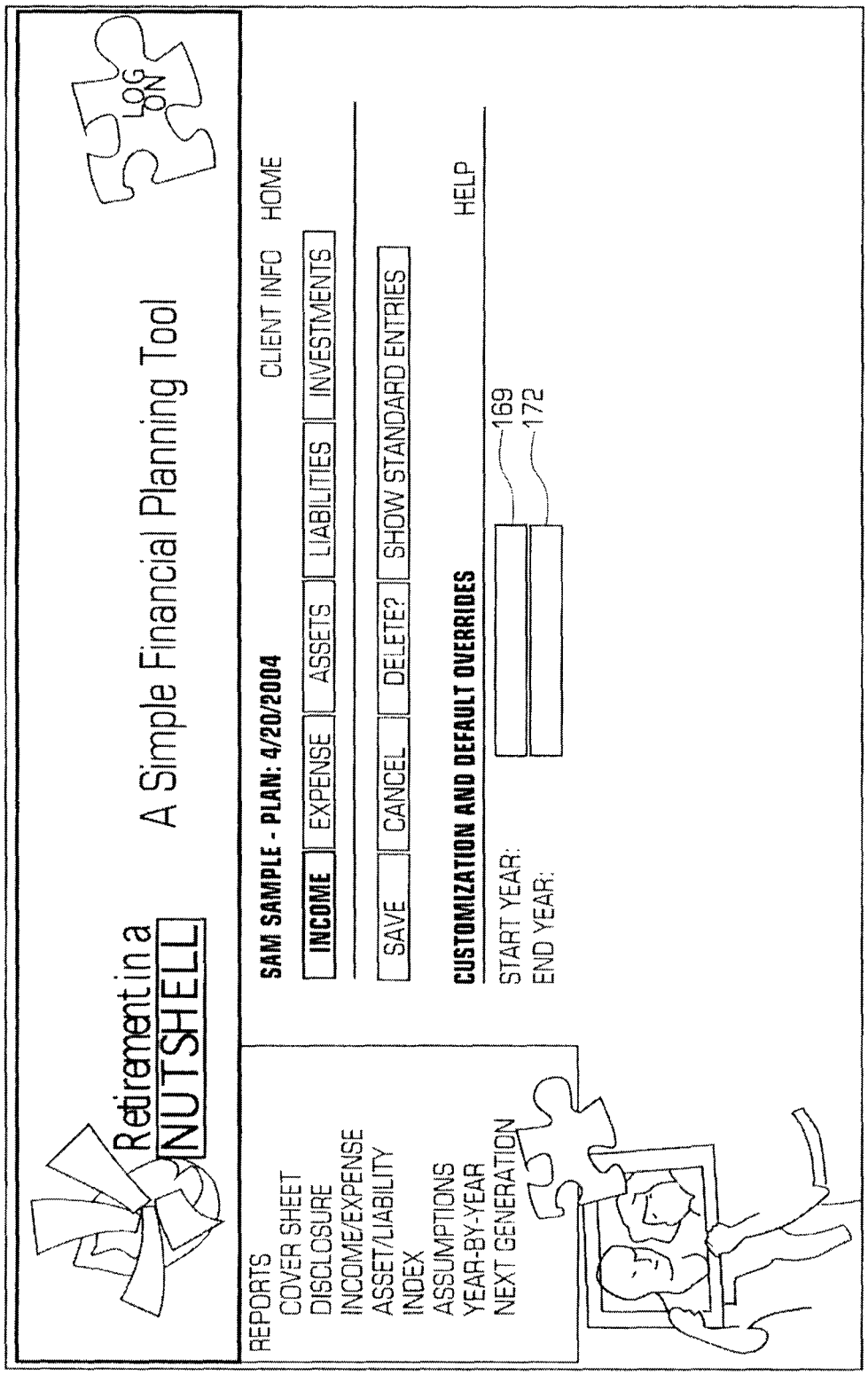
FIG. 2C2

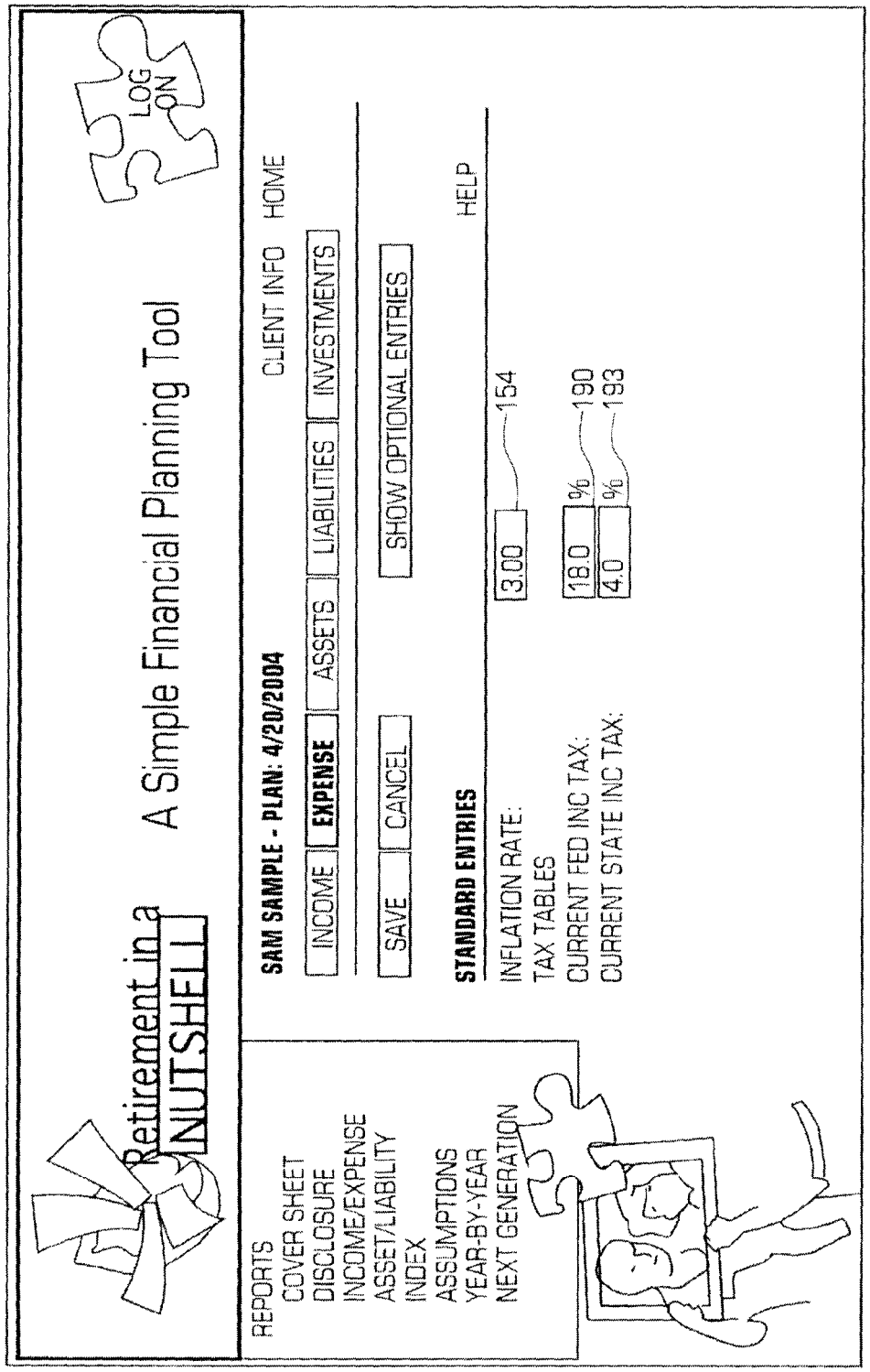
FIG. 2D1

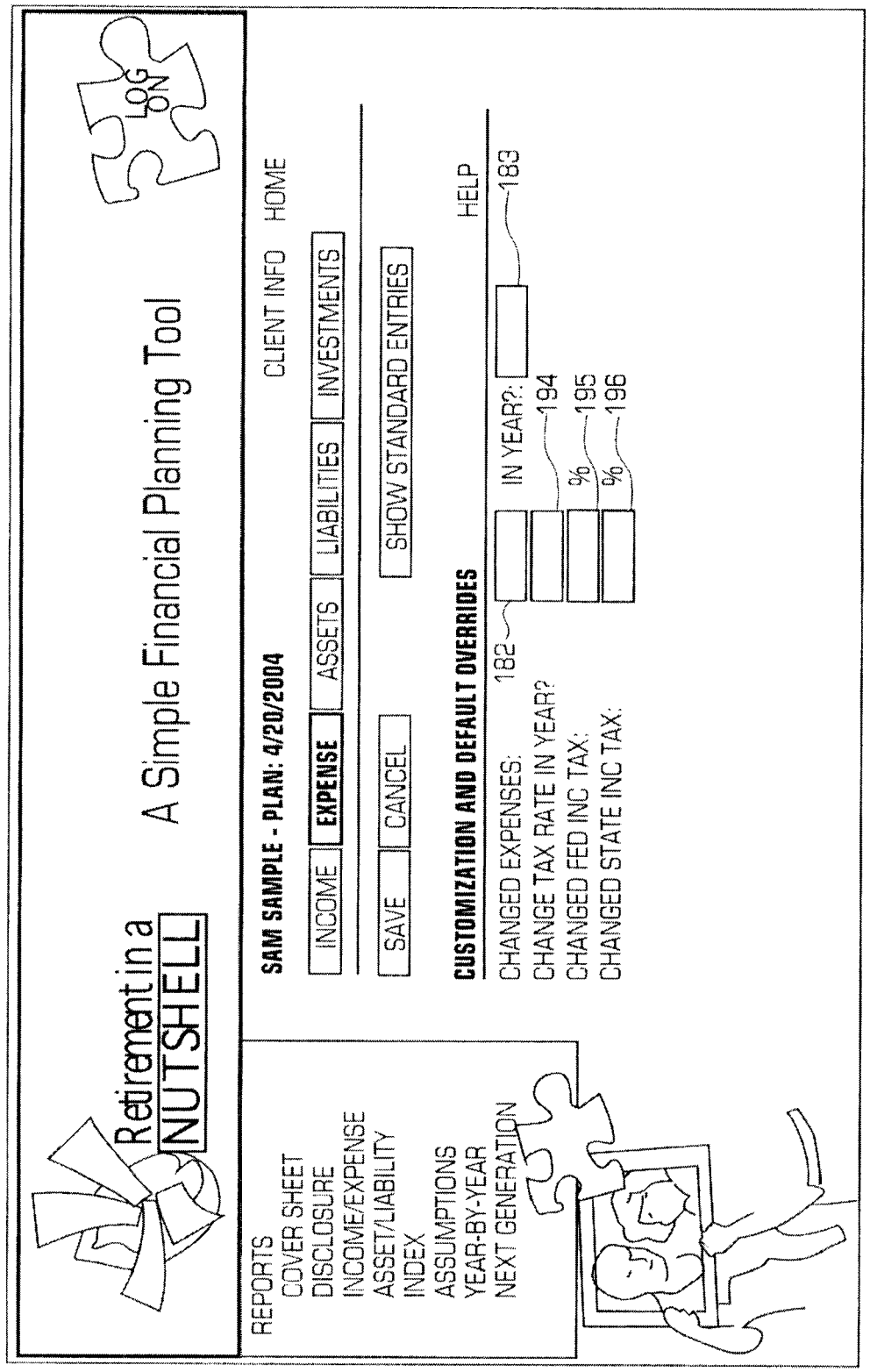
FIG. 2D2

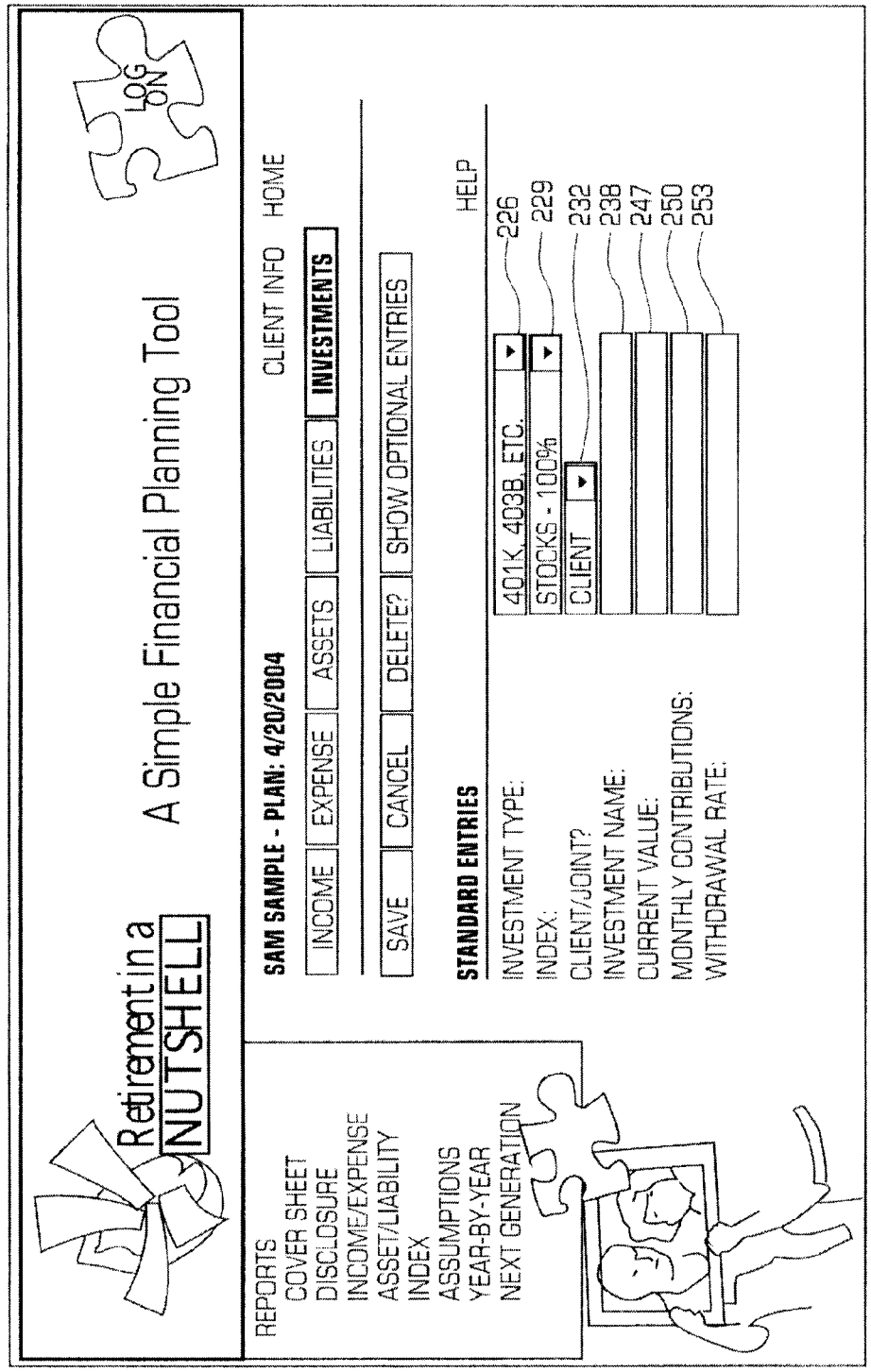
FIG. 2G1

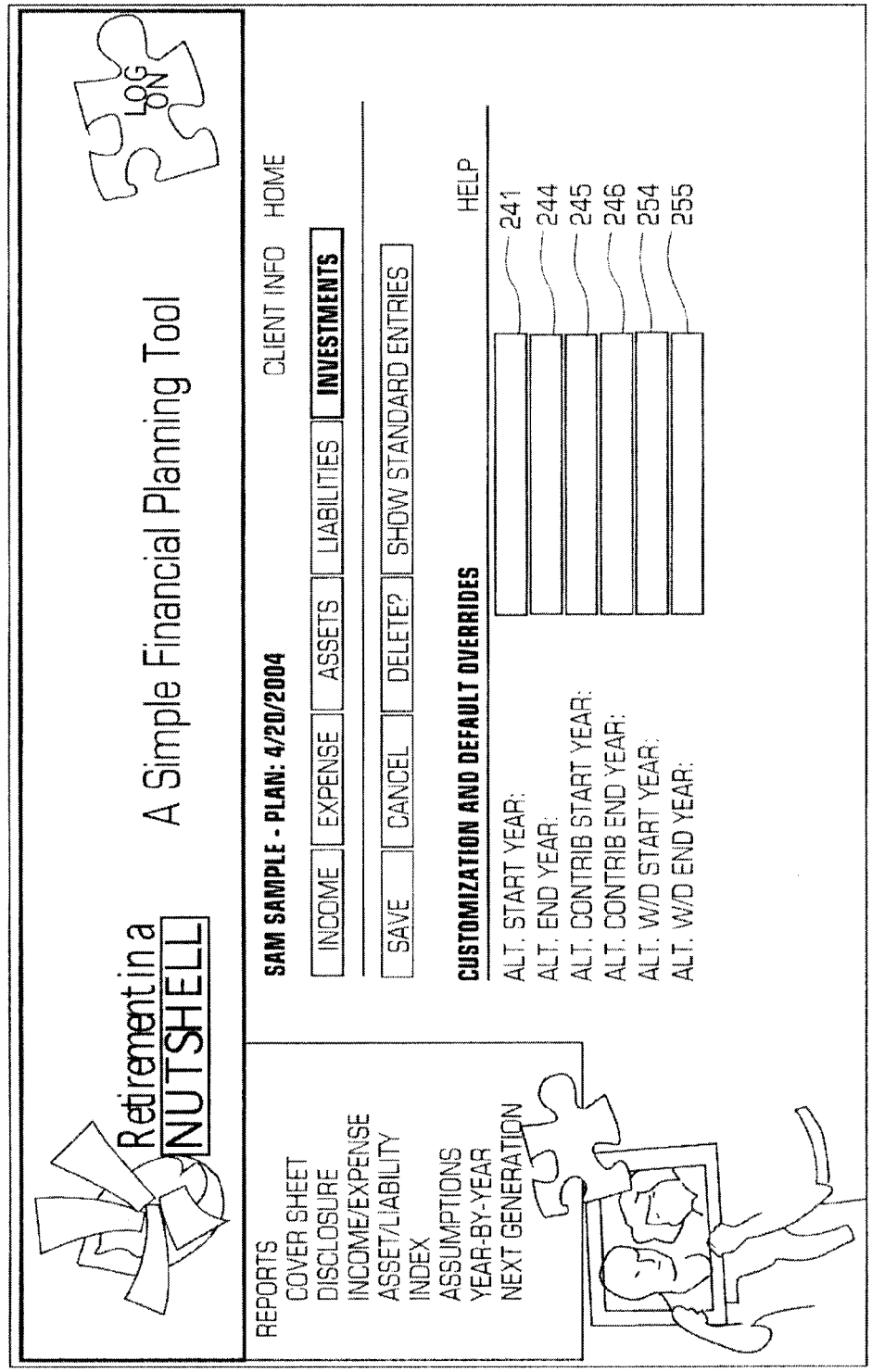
FIG. 2G2

FIGURE 3A

Retirement Worksheets

Sam & Sally Sample

Prepared for you by

Robert A. Young
LPL Financial Services, Inc.
1100 Main Street Suite 120
Woodland CA, 95695
530-666-2128

SECURITIES OFFERED THROUGH
LINSCO/PRIVATE LEDGER
MEMBER NASD/SIPC

FIGURE 3B

Disclosures

This statement has been prepared by Robert A. Young for informational purposes only and does not replace the statement(s) you should receive directly from Linsco/Private Ledger or investment sponsor(s).

This report has been prepared from data believed to be reliable but no representation is being made as to its accuracy or completeness. Securities prices may vary from actual liquidation value. Prices shown should only be used as a general guide to portfolio value. The figures presented should not be relied upon for tax purposes.

The performance information provided has not been audited as to accuracy by Linsco/Private Ledger. The calculations may not comply with AIMR standards and should be utilized only as a general guide to performance.

Direct participation program securities are generally illiquid and the price listed may not be realizable if you seek to liquidate the security.

FIGURE 3C

| | | | | | |
|---|---|---|---|---|---|
| Sam & Sally Sample | | | | | 4/20/2004 |
| INCOME AND EXPENSES | | | | | — 300 |
| Sam - Gross Income per year | | | | | $80,000 — 301 |
| Sally - Gross Income per year | | | | | $40,000 — 302 |
| Real Estate & Other Income | | | | | $4,000 — 303 |
| Total Gross Income | | | | | $124,000 — 305 |
| Less Income Taxes | 22.0% | of Gross Income - Retirement Contributions | | | $26,488 — 306 |
| Total After Tax Income | | | | | $97,512 — 308 |
| Total Estimated Monthly Expenses | | | | | $7,000 — 309 |
| Total Estimated Annual Expenses | | | | | $84,000 — 312 |
| Actual Current Annual Expenses | | | | | |
|   Gross Income | | | | | $124,000 — 315 |
|   Less Income Taxes | | | | | $26,488 — 318 |
|   Less Retirement and Savings Contributions | | | | | $6,600 — 321 |
|   Less College Savings Contributions | | | | | $6,000 — 324 |
|       Net Actual Annual Expenses | | | | | $84,912 — 327 |
|       Net Actual Monthly Expenses | | | | | $7,076 — 330 |
| House Payment (Excl. Insurance and Property Taxes) | | | | | $1,660 — 333 |
| Investment Real Estate Payments (Excl. Insurance and Property Taxes) | | | | | $358 — 336 |
| Other Installment Payments | | | | | $1,161 — 339 |
|       Net Monthly Living Expenses | | | | | $3,897 — 342 |
| Retirement Income at Retirement Age | | | | Age | |
| Sam | | | | | — 345 |
|   Retirement Plan | | | | 60 | $0 — 348 |
|   Social Security | $1,800 | x Inflation | 3.0% | 62 | $2,657 — 351 |
| Sally | | | | | — 354 |
|   Retirement Plan | | | | 58 | $1,667 — 357 |
|   Social Security | $500 | x Inflation | 3.0% | 62 | $761 — 360 |

FIGURE 3D

Sam & Sally Sample                                                                 4/20/2004

|  |  |  | Current Market Value | Monthly Additions |
|---|---|---|---|---|
| 400 — ASSETS AND LIABILITIES | | | | |
| | Bank Checking | | | |
| | | BofA Checking | $5,000 | $0 |
| | Emergency Funds | | | |
| | | BofA Savings | $20,000 | $0 |
| | Residence | | | |
| | | Residence | $500,000 | $0 |
| | Vacation Home | | | |
| | | Cabin | $125,000 | $0 |
| 410 — NON-RETIREMENT INVESTMENTS | | | | |
| | Growth Fund of America | Mutual Fund NQ | $20,000 | $0 |
| | Investment Real Estate | Investment Real Estate | $100,000 | $0 |
| | College Fund | College | $12,000 | $500 |
| 420 — RETIREMENT INVESTMENTS | | | | |
| Sam | | | | |
| | 401k Plan | Company 401K, 403B, etc. | $60,000 | $200 |
| | American Funds IRA | Regular IRA | $12,000 | $0 |
| | VanKampen - Roth | Roth IRA | $10,000 | $250 |
| Sally | | | | |
| | Teacher 403b | Company 401K, 403B, etc. | $15,000 | $100 |
| 428 — Total Monthly Additions | | | | $1,050 |
| 430 — LIABILITIES | | | | |
| | Residence Loan | House Loan | $200,000 | |
| | Investment RE Loan | Real Estate Loan | $48,000 | |
| | Other Loan | Business Loan | $60,000 | |
| 440 — NET WORTH | | | $571,000 | |

FIGURE 3E

Sam & Sally Sample                                                                                    4/20/2004

Basis for Setting Investment Targets

Each investment account has been analyzed to determine which of the catagories below best describe what investments are held in that account. The target return for that account has been based on the appropriate index returns as shown below:

|  |  |  | Target Return* |  |
|---|---|---|---|---|
| Stocks - 100% | Russell 3000 Stock Index - 10 Year Average | | 9.64% | — 500 |
| Bonds - 100% | Lehman Intermediate Govt. Bond Index - 10 Year Average | | 6.76% | — 503 |
| Cash - 100% | Treasury Bill - 3 Month - 1 Year Average | | 1.35% | — 506 |
| Real Estate - 100% | S & P REIT Composite - 3 Year Average | | 7.71% | — 509 |

Blended Accounts and Mutual Funds  — 520

|  | Stocks | Bonds | Cash |  |  |
|---|---|---|---|---|---|
| Agressive Growth | 95% | 0% | 5% | 9.23% | — 523 |
| Growth | 80% | 15% | 5% | 8.79% | — 526 |
| Growth with Income | 60% | 35% | 5% | 8.22% | — 529 |
| Income with Growth | 40% | 53% | 7% | 7.53% | — 532 |
| Income with Cap Pres | 20% | 70% | 10% | 6.8% | — 535 |

FIGURE 3F

Sam & Sally Sample 4/20/2004

WORKSHEET ASSUMPTIONS

| | Investment Category | Current Value | Annual Additions | Target Rate of Return * | Assumed Retirement Withdrawals |
|---|---|---|---|---|---|
| NON-RETIREMENT | | | | | |
| Growth Fund of America | Growth | $20,000 | $0 | 8.79% | 0.00% |
| Investment Real Estate | Real Estate - 100% | $100,000 | $0 | 7.71% | 4.0% |
| College Fund | Growth | $12,000 | $6,000 | 8.79% | 0.00% |
| Total | | $132,000 | $6,000 | | |
| RETIREMENT | | | | | |
| 401k Plan | Growth | $60,000 | $2,400 | 8.79% | 6.0% |
| American Funds IRA | Growth | $12,000 | $0 | 8.79% | 6.0% |
| VanKampen - Roth | Growth | $10,000 | $3,000 | 8.79% | 6.0% |
| Teacher 403b | Growth | $15,000 | $1,200 | 8.79% | 6.0% |
| Total | | $97,000 | $6,600 | | |

— 600
— 610
— 620

Income Taxes as a % of Net Income  22%  — 630
Inflation Rate  3.0%  — 640
Years Until Retirement  Client  11  — 650
                        Spouse  10  — 653

* Target returns are for illustration purposes only. There is no assurance that these results will be achieved. Actual results will vary.

| Sam & Sally Sample | Income, Expenses, & Cash Flow Targets by year | | | | Date: 4/20/2004 | |
|---|---|---|---|---|---|---|
| 700 - Year | 2005 | 2006 | 2007 | 2008 | 2009 |
| 703 - Age - Sam/Sally | 50 / 49 | 51 / 50 | 52 / 51 | 53 / 52 | 54 / 53 |
| Self Employment - Sam | $80,000 | $82,400 | $84,872 | $87,418 | $90,041 |
| Yolo County - Sally | $40,000 | $41,200 | $42,436 | $43,709 | $45,020 |
| County Retirement - Sally | | | | | |
| Social Security - Sam | | | | | |
| Social Security - Sally | | | | | |
| 708 - Total Non-Investment Income | $120,000 | $123,600 | $127,308 | $131,127 | $135,061 |
| 710 - Investment Real Estate | $100,000 | $107,710 | $116,014 | $124,959 | $134,594 |
| 713 - Income | $4,000 | $4,308 | $4,641 | $4,998 | $5,384 |
| 720 - Retirement Account - Sam | | | | | |
| 401k Plan | $60,000 | $67,674 | $76,095 | $85,329 | $95,452 |
| Income | | | | | |
| American Funds IRA | $12,000 | $13,055 | $14,202 | $15,451 | $16,809 |
| Income | | | | | |
| VanKampen - Roth | $10,000 | $13,879 | $18,189 | $22,970 | $28,268 |
| Income | | | | | |
| 730 - Retirement Account - Sally | | | | | |
| Teacher 403b | $15,000 | $17,519 | $20,294 | $23,351 | $26,715 |
| Income | | | | | |
| 735 - Target Account Values | $97,000 | $112,126 | $128,780 | $147,102 | $167,244 |
| 738 - Target Investment Income | | | | | |
| 740 - TOTAL INCOME | $124,000 | $127,908 | $131,949 | $136,126 | $140,445 |
| 745 - Retirement Contributions - Sam | $5,400 | $5,562 | $5,729 | $5,901 | $6,078 |
| 750 - Retirement Contributions - Sally | $1,200 | $1,236 | $1,273 | $1,311 | $1,351 |
| 755 - Taxable Income | $120,400 | $124,200 | $128,129 | $132,192 | $136,393 |
| 760 - Income Taxes | $26,488 | $27,324 | $28,188 | $29,082 | $30,006 |
| 770 - NET INCOME | $90,912 | $93,786 | $96,758 | $99,831 | $103,010 |
| 780 Annual Living Expenses | $46,764 | $48,167 | $49,612 | $51,100 | $52,633 |
| Residence Mortgage | $19,920 | $19,920 | $19,920 | $19,920 | $19,920 |
| Real Estate Loan Mortgage | $4,296 | $4,296 | $4,296 | $4,296 | $4,296 |
| Business Loan | $13,932 | $13,932 | $13,932 | $13,932 | $13,932 |
| 783 - College Savings | $6,000 | $6,000 | $6,000 | $6,000 | $6,000 |
| 785 - Total Annual Expenses | $90,912 | $92,315 | $93,760 | $95,248 | $96,781 |
| 790 - NET CASH FLOW | ($0) | $1,471 | $2,998 | $4,583 | $6,229 |

Target returns are for illustration purposes only. There is no assurance that these results will be achieved. Actual results will vary.

FIG. 3G-1

Sam & Sally Sample — Income, Expenses, & Cash Flow Targets by year — Date: 4/20/2004

| | 2010 | 2011 | 2012 | 2013 | 2014 |
|---|---|---|---|---|---|
| Year | 2010 | 2011 | 2012 | 2013 | 2014 |
| Age - Sam/Sally | 55 / 54 | 56 / 55 | 57 / 56 | 58 / 57 | 59 / 58 |
| Self Employment - Sam | $92,742 | $95,524 | $98,390 | $101,342 | $104,382 |
| Yolo County - Sally | $46,371 | $47,762 | $49,195 | $50,671 | |
| County Retirement - Sally | | | | | $20,000 |
| Social Security - Sam | | | | | |
| Social Security - Sally | | | | | |
| Total Non-Investment Income | $139,113 | $143,286 | $147,585 | $152,012 | $124,382 |
| Investment Real Estate | $144,971 | $156,148 | $168,187 | $181,154 | $195,121 |
| Income | $5,799 | $6,246 | $6,727 | $7,246 | $7,805 |
| Retirement Account - Sam | | | | | |
| 401k Plan | $106,544 | $118,691 | $131,990 | $146,544 | $162,465 |
| Income | | | | | |
| American Funds IRA | $18,286 | $19,894 | $21,642 | $23,545 | $25,614 |
| Income | | | | | |
| VanKampen - Roth | $34,129 | $40,607 | $47,758 | $55,646 | $64,337 |
| Income | | | | | |
| Retirement Account - Sally | | | | | |
| Teacher 403b | $30,414 | $34,479 | $38,942 | $43,841 | $49,215 |
| Income | | | | | $2,953 |
| Target Account Values | $189,373 | $213,670 | $240,333 | $269,575 | $301,632 |
| Target Investment Income | | | | | |
| TOTAL INCOME | $144,912 | $149,532 | $154,312 | $159,259 | $135,140 |
| Retirement Contributions - Sam | $6,260 | $6,448 | $6,641 | $6,841 | $7,046 |
| Retirement Contributions - Sally | $1,391 | $1,433 | $1,476 | $1,520 | |
| Taxable Income | $140,738 | $145,234 | $149,885 | $154,698 | $132,008 |
| Income Taxes | $30,962 | $31,951 | $32,975 | $34,034 | $29,042 |
| NET INCOME | $106,298 | $109,700 | $113,221 | $116,864 | $99,052 |
| Annual Living Expenses | $54,212 | $55,839 | $57,514 | $59,239 | $61,016 |
| Residence Mortgage | $19,920 | $19,920 | $19,920 | $19,920 | $19,920 |
| Real Estate Loan Mortgage | $4,296 | $4,296 | $4,296 | $4,296 | $4,296 |
| Business Loan | $13,932 | | | | |
| College Savings | $6,000 | $6,000 | $6,000 | $6,000 | $6,000 |
| Total Annual Expenses | $98,360 | $86,055 | $87,730 | $89,455 | $91,232 |
| NET CASH FLOW | $7,938 | $23,645 | $25,491 | $27,409 | $7,820 |

Target returns are for illustration purposes only. There is no assurance that these results will be achieved. Actual results will vary.

FIG. 3G-2

| Sam & Sally Sample | Income, Expenses, & Cash Flow Targets by year | | | Date: 4/20/2004 | |
|---|---|---|---|---|---|
| Year | 2015 | 2016 | 2017 | 2018 | 2019 |
| Age - Sam/Sally | 60 / 59 | 61 / 60 | 62 / 61 | 63 / 62 | 64 / 63 |
| Self Employment - Sam | | | | | |
| Yolo County - Sally | | | | | |
| County Retirement - Sally | $20,600 | $21,218 | $21,855 | $22,510 | $23,185 |
| Social Security - Sam | | | $31,887 | $32,844 | $33,829 |
| Social Security - Sally | | | | $9,127 | $9,401 |
| Total Non-Investment Income | $20,600 | $21,218 | $53,742 | $64,481 | $66,415 |
| Investment Real Estate | $210,165 | $226,369 | $243,822 | $262,620 | $282,868 |
| Income | $8,407 | $9,055 | $9,753 | $10,505 | $11,315 |
| Retirement Account - Sam | | | | | |
| 401k Plan | $179,877 | $183,947 | $188,109 | $192,365 | $196,718 |
| Income | $10,793 | $11,037 | $11,287 | $11,542 | $11,803 |
| American Funds IRA | $27,866 | $28,496 | $29,141 | $29,800 | $30,475 |
| Income | $1,672 | $1,710 | $1,748 | $1,788 | $1,828 |
| VanKampen - Roth | $73,907 | $75,579 | $77,289 | $79,038 | $80,826 |
| Income | $4,434 | $4,535 | $4,637 | $4,742 | $4,850 |
| Retirement Account - Sally | | | | | |
| Teacher 403b | $50,328 | $51,467 | $52,631 | $53,822 | $55,040 |
| Income | $3,020 | $3,088 | $3,158 | $3,229 | $3,302 |
| Target Account Values | $331,978 | $339,490 | $347,171 | $355,026 | $363,059 |
| Target Investment Income | $28,325 | $29,424 | $30,583 | $31,806 | $33,098 |
| TOTAL INCOME | $48,925 | $50,642 | $84,325 | $96,287 | $99,514 |
| Retirement Contributions - Sam | | | | | |
| Retirement Contributions - Sally | | | | | |
| Taxable Income | $48,925 | $50,642 | $84,325 | $96,287 | $99,514 |
| Income Taxes | $10,764 | $11,141 | $18,551 | $21,183 | $21,893 |
| NET INCOME | $38,162 | $39,501 | $65,773 | $75,104 | $77,621 |
| Annual Living Expenses | $62,847 | $64,732 | $66,674 | $68,675 | $70,735 |
| Residence Mortgage | $19,920 | $19,920 | $19,920 | $19,920 | |
| Real Estate Loan Mortgage | $4,296 | $4,296 | $4,296 | $4,296 | $4,296 |
| Business Loan | | | | | |
| College Savings | $6,000 | $6,000 | $6,000 | | |
| Total Annual Expenses | $93,063 | $94,948 | $96,890 | $92,891 | $75,031 |
| NET CASH FLOW | ($54,901) | ($55,447) | ($31,117) | ($17,786) | $2,590 |

Target returns are for illustration purposes only. There is no assurance that these results will be achieved. Actual results will vary.

FIG. 3G-3

| Sam & Sally Sample | Income, Expenses, & Cash Flow Targets by year | | | | Date: 4/20/2004 |
|---|---|---|---|---|---|
| Year | 2020 | 2021 | 2022 | 2023 | 2024 |
| Age - Sam/Sally | 65 / 64 | 66 / 65 | 67 / 66 | 68 / 67 | 69 / 68 |
| Self Employment - Sam | | | | | |
| Yolo County - Sally | | | | | |
| County Retirement - Sally | $23,881 | $24,597 | $25,335 | $26,095 | $26,878 |
| Social Security - Sam | $34,844 | $35,889 | $36,966 | $38,075 | $39,217 |
| Social Security - Sally | $9,683 | $9,973 | $10,273 | $10,581 | $10,898 |
| Total Non-Investment Income | $68,408 | $70,460 | $72,574 | $74,751 | $76,994 |
| Investment Real Estate | $304,678 | $328,168 | $353,470 | $380,722 | $410,076 |
| Income | $12,187 | $13,127 | $14,139 | $15,229 | $16,403 |
| Retirement Account - Sam | | | | | |
| 401k Plan | $201,169 | $205,720 | $210,375 | $215,135 | $220,003 |
| Income | $12,070 | $12,343 | $12,622 | $12,908 | $13,200 |
| American Funds IRA | $31,164 | $31,869 | $32,590 | $33,328 | $34,082 |
| Income | $1,870 | $1,912 | $1,955 | $2,000 | $2,045 |
| VanKampen - Roth | $82,655 | $84,525 | $86,438 | $88,393 | $90,393 |
| Income | $4,959 | $5,072 | $5,186 | $5,304 | $5,424 |
| Retirement Account - Sally | | | | | |
| Teacher 403b | $56,285 | $57,559 | $58,861 | $60,193 | $61,555 |
| Income | $3,377 | $3,454 | $3,532 | $3,612 | $3,693 |
| Target Account Values | $371,273 | $379,674 | $388,264 | $397,049 | $406,033 |
| Target Investment Income | $34,464 | $35,907 | $37,435 | $39,052 | $40,765 |
| TOTAL INCOME | $102,871 | $106,367 | $110,009 | $113,803 | $117,759 |
| Retirement Contributions - Sam | | | | | |
| Retirement Contributions - Sally | | | | | |
| Taxable Income | $102,871 | $106,367 | $110,009 | $113,803 | $117,759 |
| Income Taxes | $22,632 | $23,401 | $24,202 | $25,037 | $25,907 |
| NET INCOME | $80,240 | $82,967 | $85,807 | $88,766 | $91,852 |
| Annual Living Expenses | $72,857 | $75,042 | $77,294 | $79,613 | $82,001 |
| Residence Mortgage | | | | | |
| Real Estate Loan Mortgage | $4,296 | $4,296 | $4,296 | $4,296 | |
| Business Loan | | | | | |
| College Savings | | | | | |
| Total Annual Expenses | $77,153 | $79,338 | $81,590 | $83,909 | $82,001 |
| NET CASH FLOW | $3,087 | $3,628 | $4,217 | $4,858 | $9,851 |

Target returns are for illustration purposes only. There is no assurance that these results will be achieved.
Actual results will vary.

FIG. 3G-4

| Sam & Sally Sample | Income, Expenses, & Cash Flow Targets by year | | | | Date: 4/20/2004 |
|---|---|---|---|---|---|
| Year | 2025 | 2026 | 2027 | 2028 | 2029 |
| Age - Sam/Sally | 70 / 69 | 71 / 70 | 72 / 71 | 73 / 72 | 74 / 73 |
| Self Employment - Sam | | | | | |
| Yolo County - Sally | | | | | |
| County Retirement - Sally | $27,685 | $28,515 | $29,371 | $30,252 | $31,159 |
| Social Security - Sam | $40,394 | $41,606 | $42,854 | $44,139 | $45,464 |
| Social Security - Sally | $11,225 | $11,562 | $11,909 | $12,266 | $12,634 |
| Total Non-Investment Income | $79,304 | $81,683 | $84,133 | $86,657 | $89,257 |
| Investment Real Estate | $441,693 | $475,748 | $512,428 | $551,936 | $594,490 |
| Income | $17,668 | $19,030 | $20,497 | $22,077 | $23,780 |
| Retirement Account - Sam | | | | | |
| 401k Plan | $224,980 | $230,071 | $235,276 | $240,600 | $246,044 |
| Income | $13,499 | $13,804 | $14,117 | $14,436 | $14,763 |
| American Funds IRA | $34,853 | $35,642 | $36,448 | $37,273 | $38,116 |
| Income | $2,091 | $2,138 | $2,187 | $2,236 | $2,287 |
| VanKampen - Roth | $92,439 | $94,530 | $96,669 | $98,856 | $101,093 |
| Income | $5,546 | $5,672 | $5,800 | $5,931 | $6,066 |
| Retirement Account - Sally | | | | | |
| Teacher 403b | $62,948 | $64,372 | $65,828 | $67,318 | $68,841 |
| Income | $3,777 | $3,862 | $3,950 | $4,039 | $4,130 |
| Target Account Values | $415,220 | $424,615 | $434,222 | $444,047 | $454,094 |
| Target Investment Income | $42,581 | $44,507 | $46,550 | $48,720 | $51,025 |
| TOTAL INCOME | $121,884 | $126,189 | $130,684 | $135,377 | $140,282 |
| Retirement Contributions - Sam | | | | | |
| Retirement Contributions - Sally | | | | | |
| Taxable Income | $121,884 | $126,189 | $130,684 | $135,377 | $140,282 |
| Income Taxes | $26,815 | $27,762 | $28,750 | $29,783 | $30,862 |
| NET INCOME | $95,070 | $98,428 | $101,933 | $105,594 | $109,420 |
| Annual Living Expenses | $84,461 | $86,995 | $89,605 | $92,293 | $95,062 |
| Residence Mortgage | | | | | |
| Real Estate Loan Mortgage | | | | | |
| Business Loan | | | | | |
| College Savings | | | | | |
| Total Annual Expenses | $84,461 | $86,995 | $89,605 | $92,293 | $95,062 |
| NET CASH FLOW | $10,609 | $11,433 | $12,329 | $13,302 | $14,358 |

Target returns are for illustration purposes only. There is no assurance that these results will be achieved. Actual results will vary.

FIG. 3G-5

| Sam & Sally Sample | Income, Expenses, & Cash Flow Targets by year | | | | Date: 4/20/2004 |
|---|---|---|---|---|---|
| Year | 2030 | 2031 | 2032 | 2033 | 2034 |
| Age - Sam/Sally | 75 / 74 | 76 / 75 | 77 / 76 | 78 / 77 | 79 / 78 |
| Self Employment - Sam | | | | | |
| Yolo County - Sally | | | | | |
| County Retirement - Sally | $32,094 | $33,057 | $34,049 | $35,070 | $36,122 |
| Social Security - Sam | $46,828 | $48,232 | $49,679 | $51,170 | $52,705 |
| Social Security - Sally | $13,013 | $13,403 | $13,805 | $14,220 | $14,646 |
| Total Non-Investment Income | $91,935 | $94,693 | $97,533 | $100,459 | $103,473 |
| Investment Real Estate | $640,325 | $689,694 | $742,870 | $800,145 | $861,836 |
| Income | $25,613 | $27,588 | $29,715 | $32,006 | $34,473 |
| Retirement Account - Sam | | | | | |
| 401k Plan | $251,610 | $257,303 | $263,125 | $269,079 | $275,167 |
| Income | $15,097 | $15,438 | $15,788 | $16,145 | $16,510 |
| American Funds IRA | $38,978 | $39,860 | $40,762 | $41,684 | $42,628 |
| Income | $2,339 | $2,392 | $2,446 | $2,501 | $2,558 |
| VanKampen - Roth | $103,380 | $105,719 | $108,111 | $110,558 | $113,059 |
| Income | $6,203 | $6,343 | $6,487 | $6,633 | $6,784 |
| Retirement Account - Sally | | | | | |
| Teacher 403b | $70,399 | $71,991 | $73,620 | $75,286 | $76,990 |
| Income | $4,224 | $4,319 | $4,417 | $4,517 | $4,619 |
| Target Account Values | $464,368 | $474,875 | $485,619 | $496,607 | $507,843 |
| Target Investment Income | $53,475 | $56,080 | $58,852 | $61,802 | $64,944 |
| TOTAL INCOME | $145,410 | $150,773 | $156,385 | $162,262 | $168,417 |
| Retirement Contributions - Sam | | | | | |
| Retirement Contributions - Sally | | | | | |
| Taxable Income | $145,410 | $150,773 | $156,385 | $162,262 | $168,417 |
| Income Taxes | $31,990 | $33,170 | $34,405 | $35,698 | $37,052 |
| NET INCOME | $113,420 | $117,603 | $121,981 | $126,564 | $131,365 |
| Annual Living Expenses | $97,913 | $100,851 | $103,876 | $106,993 | $110,202 |
| Residence Mortgage | | | | | |
| Real Estate Loan Mortgage | | | | | |
| Business Loan | | | | | |
| College Savings | | | | | |
| Total Annual Expenses | $97,913 | $100,851 | $103,876 | $106,993 | $110,202 |
| NET CASH FLOW | $15,506 | $16,752 | $18,104 | $19,571 | $21,163 |

Target returns are for illustration purposes only. There is no assurance that these results will be achieved.
Actual results will vary.

FIG. 3G-6

| Sam & Sally Sample | Income, Expenses, & Cash Flow Targets by year | | | | Date: 4/20/2004 |
|---|---|---|---|---|---|
| Year | 2035 | 2036 | 2037 | 2038 | 2039 |
| Age - Sam/Sally | 80 / 79 | 81 / 80 | 82 / 81 | 83 / 82 | 84 / 83 |
| Self Employment - Sam | | | | | |
| Yolo County - Sally | | | | | |
| County Retirement - Sally | $37,206 | $38,322 | $39,472 | $40,656 | $41,876 |
| Social Security - Sam | $54,286 | $55,915 | $57,592 | $59,320 | $61,099 |
| Social Security - Sally | $15,086 | $15,538 | $16,004 | $16,484 | $16,979 |
| Total Non-Investment Income | $106,577 | $109,775 | $113,068 | $116,460 | $119,954 |
| Investment Real Estate | $928,284 | $999,854 | $1,076,943 | $1,159,976 | $1,249,410 |
| Income | $37,131 | $39,994 | $43,078 | $46,399 | $49,976 |
| Retirement Account - Sam | | | | | |
| 401k Plan | $281,393 | $287,760 | $294,270 | $300,929 | $307,737 |
| Income | $16,884 | $17,266 | $17,656 | $18,056 | $18,464 |
| American Funds IRA | $43,592 | $44,578 | $45,587 | $46,618 | $47,673 |
| Income | $2,616 | $2,675 | $2,735 | $2,797 | $2,860 |
| VanKampen - Roth | $115,617 | $118,233 | $120,908 | $123,644 | $126,441 |
| Income | $6,937 | $7,094 | $7,254 | $7,419 | $7,586 |
| Retirement Account - Sally | | | | | |
| Teacher 403b | $78,731 | $80,513 | $82,335 | $84,197 | $86,103 |
| Income | $4,724 | $4,831 | $4,940 | $5,052 | $5,166 |
| Target Account Values | $519,333 | $531,084 | $543,100 | $555,388 | $567,955 |
| Target Investment Income | $68,291 | $71,859 | $75,664 | $79,722 | $84,054 |
| TOTAL INCOME | $174,869 | $181,634 | $188,732 | $196,182 | $204,007 |
| Retirement Contributions - Sam | | | | | |
| Retirement Contributions - Sally | | | | | |
| Taxable Income | $174,869 | $181,634 | $188,732 | $196,182 | $204,007 |
| Income Taxes | $38,471 | $39,959 | $41,521 | $43,160 | $44,882 |
| NET INCOME | $136,398 | $141,674 | $147,211 | $153,022 | $159,126 |
| Annual Living Expenses | $113,509 | $116,914 | $120,421 | $124,034 | $127,755 |
| Residence Mortgage | | | | | |
| Real Estate Loan Mortgage | | | | | |
| Business Loan | | | | | |
| College Savings | | | | | |
| Total Annual Expenses | $113,509 | $116,914 | $120,421 | $124,034 | $127,755 |
| NET CASH FLOW | $22,889 | $24,761 | $26,790 | $28,988 | $31,371 |

Target returns are for illustration purposes only. There is no assurance that these results will be achieved.
Actual results will vary.

FIG. 3G-7

| Sam & Sally Sample | Income, Expenses, & Cash Flow Targets by year | | | | Date: 4/20/2004 |
|---|---|---|---|---|---|
| Year | 2040 | 2041 | 2042 | 2043 | 2044 |
| Age - Sam/Sally | 85 / 84 | 86 / 85 | 87 / 86 | 88 / 87 | 89 / 88 |
| Self Employment - Sam | | | | | |
| Yolo County - Sally | | | | | |
| County Retirement - Sally | $43,132 | $44,426 | $45,759 | $47,131 | $48,545 |
| Social Security - Sam | $62,932 | $64,820 | $66,765 | $68,768 | $70,831 |
| Social Security - Sally | $17,488 | $18,013 | $18,553 | $19,110 | $19,683 |
| Total Non-Investment Income | $123,552 | $127,259 | $131,077 | $135,009 | $139,059 |
| Investment Real Estate | $1,345,739 | $1,449,496 | $1,561,252 | $1,681,624 | $1,811,278 |
| Income | $53,830 | $57,980 | $62,450 | $67,265 | $72,451 |
| Retirement Account - Sam | | | | | |
| 401k Plan | $314,700 | $321,821 | $329,102 | $336,548 | $344,163 |
| Income | $18,882 | $19,309 | $19,746 | $20,193 | $20,650 |
| American Funds IRA | $48,752 | $49,855 | $50,983 | $52,137 | $53,316 |
| Income | $2,925 | $2,991 | $3,059 | $3,128 | $3,199 |
| VanKampen - Roth | $129,302 | $132,228 | $135,220 | $138,279 | $141,408 |
| Income | $7,758 | $7,934 | $8,113 | $8,297 | $8,484 |
| Retirement Account - Sally | | | | | |
| Teacher 403b | $88,051 | $90,043 | $92,080 | $94,164 | $96,294 |
| Income | $5,283 | $5,403 | $5,525 | $5,650 | $5,778 |
| Target Account Values | $580,805 | $593,946 | $607,385 | $621,128 | $635,181 |
| Target Investment Income | $88,678 | $93,617 | $98,893 | $104,533 | $110,562 |
| TOTAL INCOME | $212,230 | $220,876 | $229,970 | $239,542 | $249,621 |
| Retirement Contributions - Sam | | | | | |
| Retirement Contributions - Sally | | | | | |
| Taxable Income | $212,230 | $220,876 | $229,970 | $239,542 | $249,621 |
| Income Taxes | $46,691 | $48,593 | $50,593 | $52,699 | $54,917 |
| NET INCOME | $165,540 | $172,283 | $179,376 | $186,842 | $194,705 |
| Annual Living Expenses | $131,587 | $135,535 | $139,601 | $143,789 | $148,103 |
| Residence Mortgage | | | | | |
| Real Estate Loan Mortgage | | | | | |
| Business Loan | | | | | |
| College Savings | | | | | |
| Total Annual Expenses | $131,587 | $135,535 | $139,601 | $143,789 | $148,103 |
| NET CASH FLOW | $33,952 | $36,748 | $39,775 | $43,053 | $46,602 |

Target returns are for illustration purposes only. There is no assurance that these results will be achieved.
Actual results will vary.

FIG. 3G-8

| | | |
|---|---|---|
| Sam & Sally Sample | Income, Expenses, & Cash Flow Targets by year | Date: 4/20/2004 |

| | |
|---|---|
| Year | 2045 |
| Age - Sam/Sally | 90 / 89 |
| | |
| Self Employment - Sam | |
| Yolo County - Sally | |
| County Retirement - Sally | $50,002 |
| Social Security - Sam | $72,956 |
| Social Security - Sally | $20,274 |
| | |
| Total Non-Investment Income | $143,231 |
| | |
| Investment Real Estate | $1,950,927 |
| Income | $78,037 |
| | |
| Retirement Account - Sam | |
| 401k Plan | $351,950 |
| Income | $21,117 |
| American Funds IRA | $54,523 |
| Income | $3,271 |
| VanKampen - Roth | $144,607 |
| Income | $8,676 |
| | |
| Retirement Account - Sally | |
| Teacher 403b | $98,473 |
| Income | $5,908 |
| | |
| Target Account Values | $649,553 |
| Target Investment Income | $117,010 |
| | |
| TOTAL INCOME | $260,241 |
| | |
| Retirement Contributions - Sam | |
| Retirement Contributions - Sally | |
| Taxable Income | $260,241 |
| Income Taxes | $57,253 |
| | |
| NET INCOME | $202,988 |
| | |
| Annual Living Expenses | $152,546 |
| Residence Mortgage | |
| Real Estate Loan Mortgage | |
| Business Loan | |
| College Savings | |
| Total Annual Expenses | $152,546 |
| | |
| NET CASH FLOW | $50,442 |

Target returns are for illustration purposes only. There is no assurance that these results will be achieved. Actual results will vary.

FIG. 3G-9

Sam & Sally Sample

**Income, Expenses, & Cash Flow Targets
by year**

Date: 4/20/2004

**Cash Flow Surplus
Before Retirement**

| | |
|---|---|
| Lump Sum - One Time: | $63,131 |
| or Annual Available: | $16,065 |
| or Monthly Available: | $1,276 |

**Contributions Needed to Meet
Cash Flow (Shortfall)
After Retirement**

| | |
|---|---|
| Lump Sum - One Time: | ($62,862) |
| or Annual Contributions: | ($9,705) |
| or Monthly Contributions: | ($763) |

Target returns are for Illustration purposes only. There is no assurance that these results will be achieved.
Actual results will vary.

| | | | | | |
|---|---|---|---|---|---|
| Sam & Sally Sample | | | | | 4/20/2004 |
| 810 — Options for the Next Generation | | | | | |
| 813 ——————— YEAR | | | | | |
| 815 ——— | 2046 | 2051 | 2061 | 2071 | 2081 |
| 820 — Option 1 - Lump Sum | $649,553 | | | | |
| 823 — Taxes 40% | $259,821 | | | | |
| 826 — Net Lump Sum Invested at 10% Taxable (7% After Taxes) | $389,732 | $401,166 | $425,050 | $450,357 | $477,170 |
| 829 — Annual Withdrawals of 6%/Yr. | $23,384 | $24,070 | $25,503 | $27,021 | $28,630 |
| 832 — Total Withdrawals | | | | | $938,573 |
| | | | | | |
| 840 — Option 2 - Lump Sum of 25% - Balance over Lifetime of 35 Years | $162,388 | | | | |
| 843 — Taxes 40% | $64,955 | | | | |
| 846 — Net after Tax | $97,433 | | | | |
| 849 — Balance Invested at 10% Tax Deferred | $487,165 | $677,482 | $1,208,084 | $1,709,160 | $738,853 |
| 852 — Annual Withdrawn using remaining Life Exp | $13,919 | $21,171 | $54,913 | $142,430 | $369,427 |
| 855 — Total Withdrawals | | | | | $4,325,460 |
| | | | | | |
| 860 — Option 3 - Withdrawals over Lifetime of 35 Years | | | | | |
| 863 — Balance Invested at 10% Tax Deferred | $649,553 | $903,309 | $1,610,779 | $2,278,880 | $985,138 |
| 866 — Annual Withdrawn using remaining Life Exp | $18,559 | $28,228 | $73,217 | $189,907 | $492,569 |
| 869 — Total Withdrawals | | | | | $5,767,280 |

Projected returns are for illustration purposes only. There is no assurance that these results will be achieved. Actual results will vary.

FINANCIAL PLANNING DOCUMENT AND PROCESS THEREFOR

RELATED APPLICATIONS

Priority is claimed to Provisional Application Ser. No. 60/683,940 filed on May 24, 2005.

FIELD OF THE INVENTION

This invention relates to computer programs, methods, and systems designed to facilitate financial and cash flow planning for individuals during their retirement.

BACKGROUND OF THE INVENTION

It is essential for individuals to be able to see how all the pieces of their financial situation such as; salary, self-employment income, pensions, Social Security, investments, contributions to savings, retirements contributions and accounts, debt service, and living expenses come together at some point in the future when they plan to retire or work less. It is critical for them to see how all of these factors impact the net cash flow and whether they will have enough income to support their desired standard of living throughout their lifetime. If the cash flow is insufficient to meet their needs in future years, it is essential for them to know how much they need to contribute monthly, annually, or in a lump sum today so that they will have the necessary cash flow in retirement.

There are many existing financial planning programs that are designed to provide this type of information. Most of those programs require very detailed information about a client's budget and expenses as well as all aspects of their assets, liabilities, and investments. They often require the client to fill out forms and provide financial information that takes them an hour or more to itemize. They often, also require a financial professional or their staff to input the data into a computer program that takes them an hour or more for input. Because of the time involved, financial professionals often need to charge many hundreds or thousands of dollars for such a plan. The cost and complexity of these programs make it difficult for all individuals or families to have access to this type of information and make it impractical for individuals to input their own data or prepare their own plans. Most of the simpler computer programs designed for use by individuals who are not financial professionals, show one aspect of their financial situation but not a comprehensive overview.

Many of the existing financial planning computer programs produce reports that are very lengthy, often 45 or 50 pages in length or more, with canned paragraphs and verbiage to accommodate various conclusions depending on the data entered and various mathematical results. While the data entered is often detailed, it also often uses line graphs and charts to show total cash flow or total value of assets at different points during the retirement period without showing the detail of the financial pieces that make up that total. Rather than seeing how all of the financial pieces come together on a year by year basis, the report requires the client to trust that the totals represented by the lines are correct. That makes it difficult for the client to know how the totals were derived and, thus, reduces the believability of the totals.

Because of the complexity of many financial planning programs, it is very difficult to easily identify errors in data entry and it is very time consuming to address those errors and print out a corrected report.

This purpose of this invention is to: reduce the input data needed to a minimum required for preparing detailed reports of a client's current financial situation and resulting cash flows throughout their lifetime; reduce the time needed to prepare these detailed reports to sometimes as low as fifteen or twenty minutes; produce a report that shows enough detail of all the pieces of a client's financial positions affecting cash flow on a year by year basis that the client can see how the numbers were derived and have confidence in their accuracy; make it possible to identify and correct data entry errors in a short time, perhaps no more than ten minutes; allow adjustments to assumptions contained in the reports with a few keystrokes; provide clients with the amounts of contributions required monthly, annually, or lump sum to address all future cash flow shortfalls; allow individuals or professionals to prepare and print a final report with any needed adjustments or corrections within a short time, perhaps thirty to forty five minutes; make data entry simple enough for individuals to prepare their own reports; quickly provide financial professionals with a detailed overview of a client's current financial position and retirement needs to allow them to give individuals comprehensive advice or analysis of the client's financial situation within a single meeting, usually no more than one hour in length.

SUMMARY OF THE INVENTION

Disclosed is a computer program that can be installed on a computer server and designed as web pages that can be accessed over the Internet by password to prepare financial planning reports. One of the key features of this program that saves substantial time and effort for both the professional advisor and the individual is the way in which a person's present living expenses or standard of living is determined. Typically, financial planning programs require individuals to itemize and review their existing expenses. This requires them to review their monthly bills and checks written to come up with an average monthly or annual cost for each item that can then be totaled to arrive at their current expenses. The disclosed program actually computes for the client, what their monthly expenses are by working backwards from gross income. The program takes gross income, subtracts income taxes, subtracts all money put into savings programs, and whatever is left is what the client spends in a given year or month. It further itemizes and subtracts the monthly payments for debt service since these items will be fully amortized or paid off at some point in the future and should not be included in baseline living expenses that will continue through a person's lifetime. The balance left after these calculations are completed represents the individual's current annual living expenses or standard of living that needs to be sustained throughout their lifetime with adjustments for inflation. This is a computer implemented process using the arithmetic logic circuitry of a digital computer. Such arithmetic logic circuitry has been known since the dawn of digital computers and need not be explained in detail here. One example of this circuitry is seen in U.S. Pat. No. 4,422,143 issued Dec. 30, 1983 and incorporated herein by reference. Many other examples can be shown.

There are three major reports that the program produces: (1) an income and expense report; (2) an asset and liability report or balance sheet; and (3) a cash flow report that shows all of items that impact cash flow on a year by year basis throughout the rest of the individual or client's lifetime.

If there are cash flow shortfalls in any year, the program uses a two step present value calculation to determine how much the individual would need in a lump sum today or contribute monthly or annually to provide sufficient funds in the year needed to fill the shortfall.

BRIEF DESCRIPTION OF THE DRAWINGS

The following figures are illustrations of display screens useful in the disclosed system.

FIG. 1A illustrates the Flow of Program Information and Data in one embodiment of our invention.

FIG. 2C illustrates an input screen for Entering Income Standard Entries.

FIG. 2D illustrates an input screen for Entering Expense Standard Entries.

FIG. 2G illustrates an input screen for Entering Investment Standard and investment optional Entries.

FIG. 3A illustrates a Report Cover Page with Client and Advisor Information.

FIG. 3B illustrates Legal and Compliance Disclosures.

FIG. 3C illustrates a Client Income and Expense Report.

FIG. 3D illustrates a Client Asset and Liability Report.

FIG. 3E illustrates a Basis for Setting Investment Target Returns.

FIG. 3F illustrates Assumptions Used for Preparing Reports.

FIGS. 3G1 through 3G9 illustrate a Year by Year Report of Client Income, Expenses, and Cash Flow Targets.

FIG. 3G10 illustrates a Cash Flow Surplus or Shortfall Report.

FIG. 3H illustrates Withdrawal Options for the Next Generation.

DETAILED DESCRIPTION

Figure 1B:
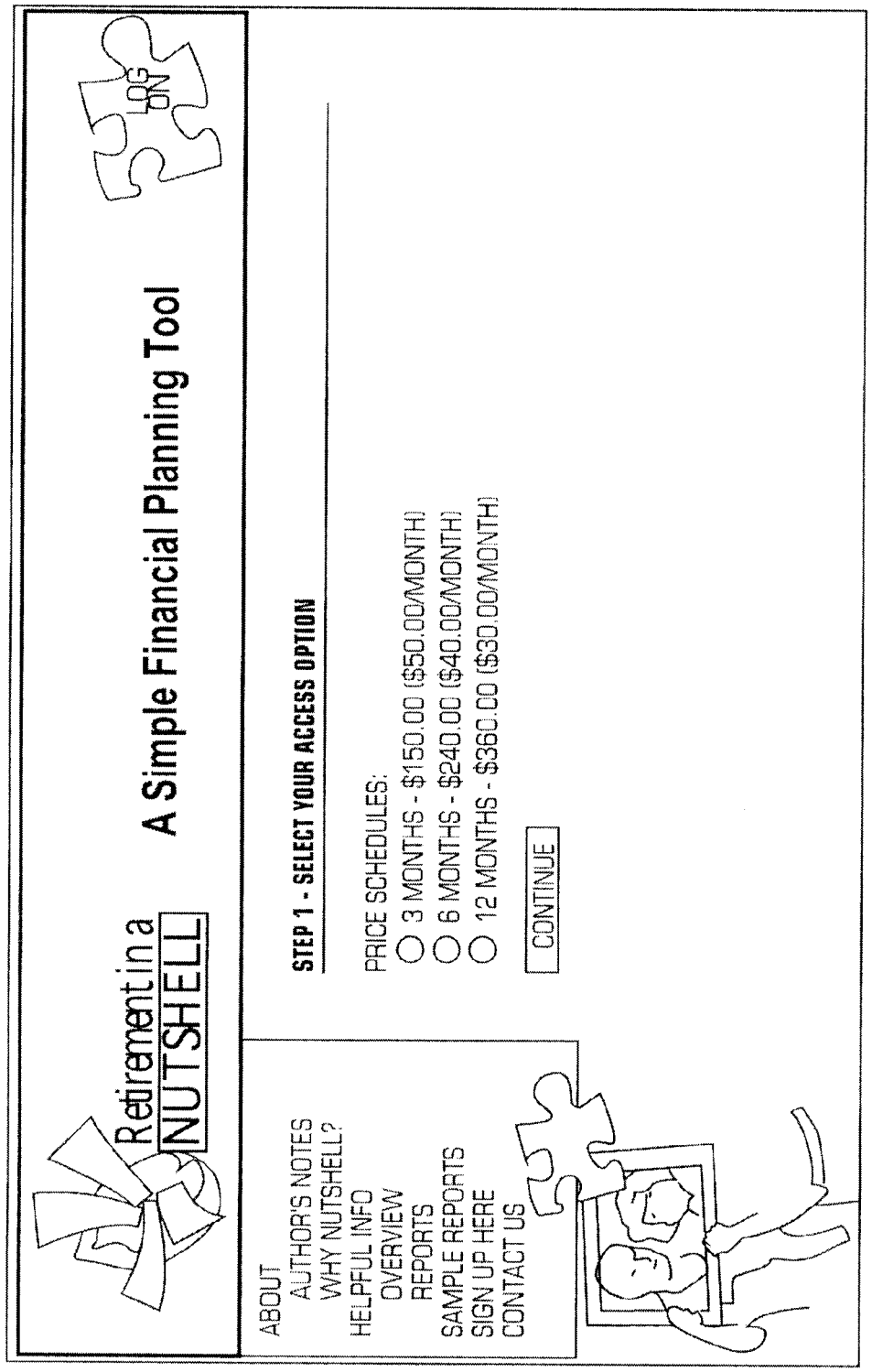
FIG. 1B illustrates an input screen for Price Schedules for becoming a System User.
Figure 1C:
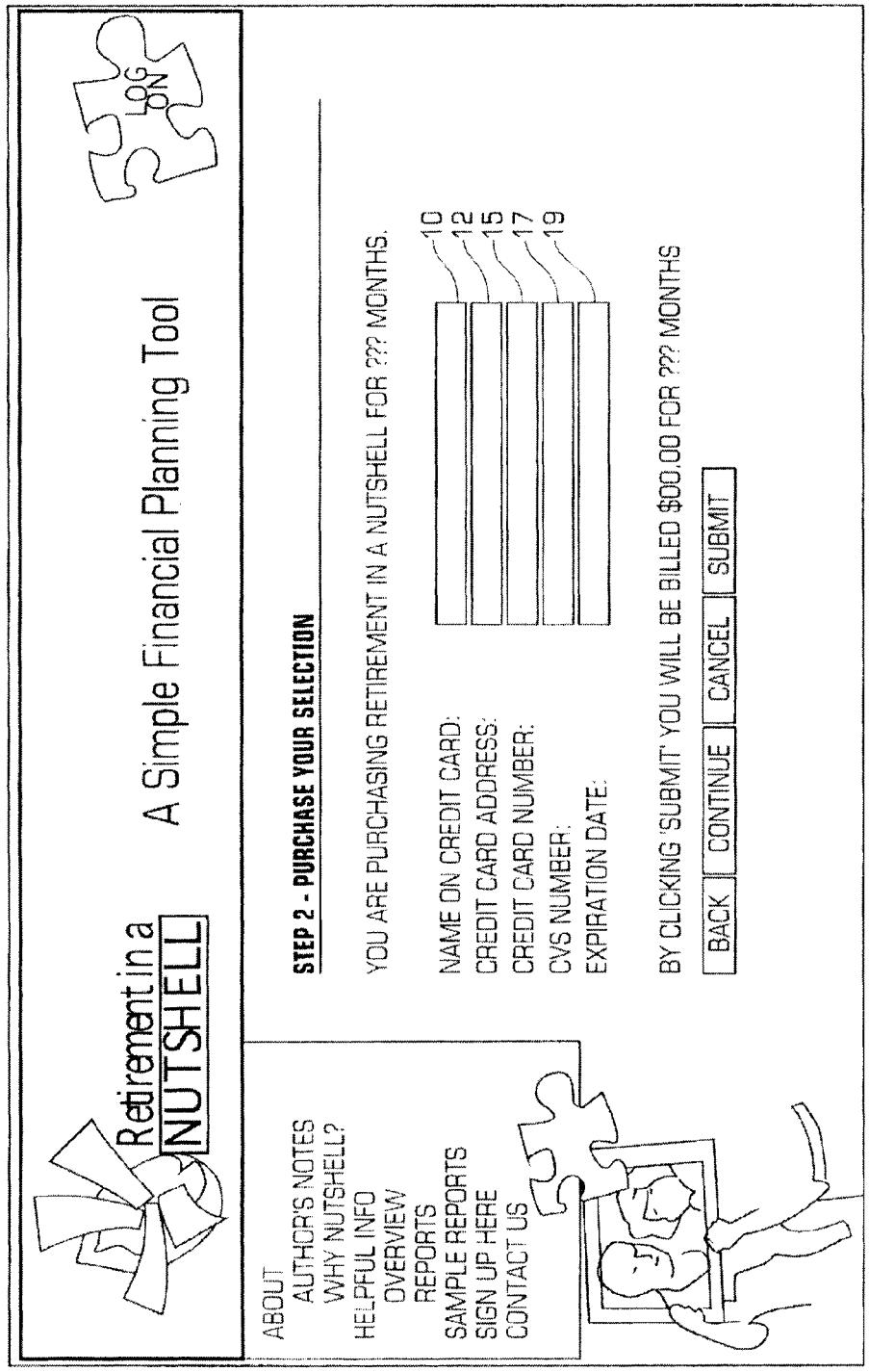
FIG. 1C illustrates an input screen for Payment and Credit Card Information.

Referring to FIG. 1A, the flow of information from data input screens to the above three primary reports produced by the invention is shown in block form. Generally, the process is to use the input screens shown in Input Screens FIGS. 1B through 1F and 1D, E and F and Input Screens FIGS. 2A through 2G to provide to a program the information necessary to produce the documents and reports shown in FIGS. 3A through 3H. It will be appreciated that the screens can be combined as expanded to produce less than or more than twelve screens, and that twelve screens is used only as an example.

The following is a detailed description of each of the input screens and how the information provided in those screens can be used in preparing all of the documents and reports.

Figure 1D:
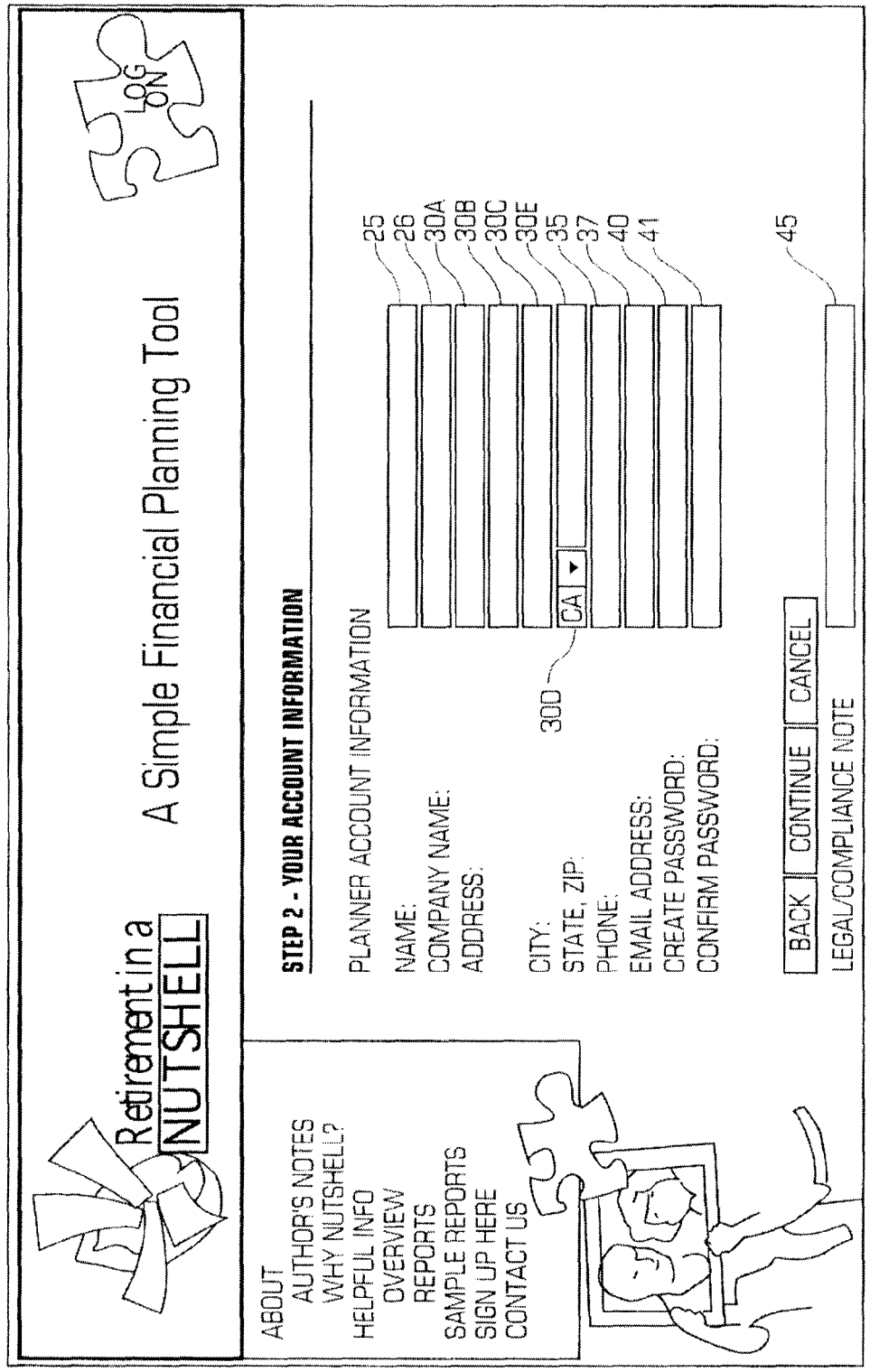
FIG. 1D illustrates an input screen for Planner/User Account Information.

Input Screen FIG. 1D—New Member User. When a new user, such as a financial planner or a non-financial professional user, wants to become a member and use the web site, they are asked to enter personal information. Terms such as "user," "planner: and "advisor" will be used interchangeably. They are asked to enter their name in field 25. They enter the name of their business in field 26. They enter the address of their business in fields 30A-30E. Their phone number is entered in field 35. They enter any required legal compliance wording in field 37. The program then inserts this information on the Cover Page—FIG. 3A and the Disclosures page FIG. 3B of each plan they prepare.

Figure 1E:
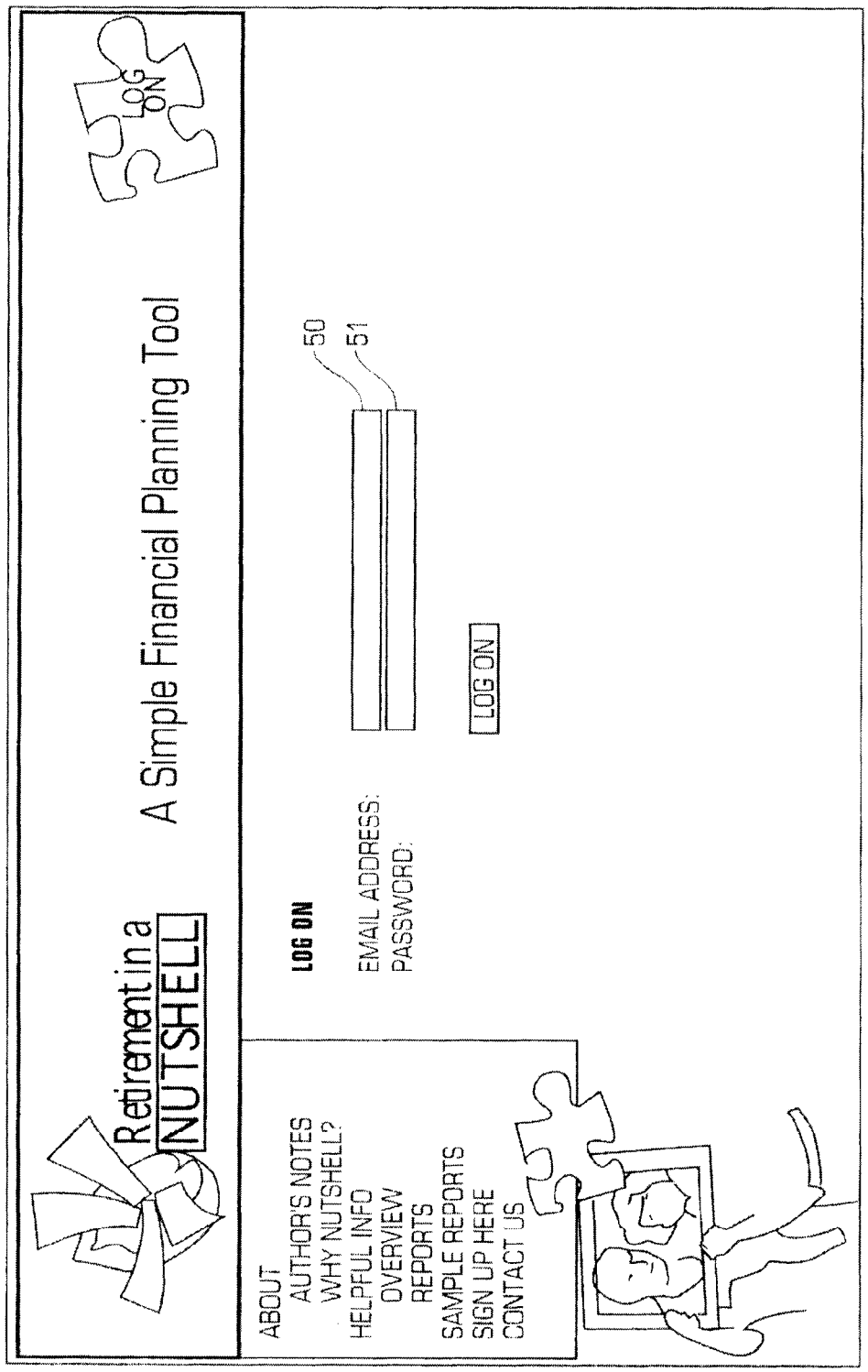
FIG. 1E illustrates in input screen for Logging On to Use the Program.

Input Screen FIG. 1E—Log On. When a member user of the program first logs on to the web site, they are asked to enter their e-mail address in field 50 and their password in field 51 to gain access to the program.

Figure 1F:
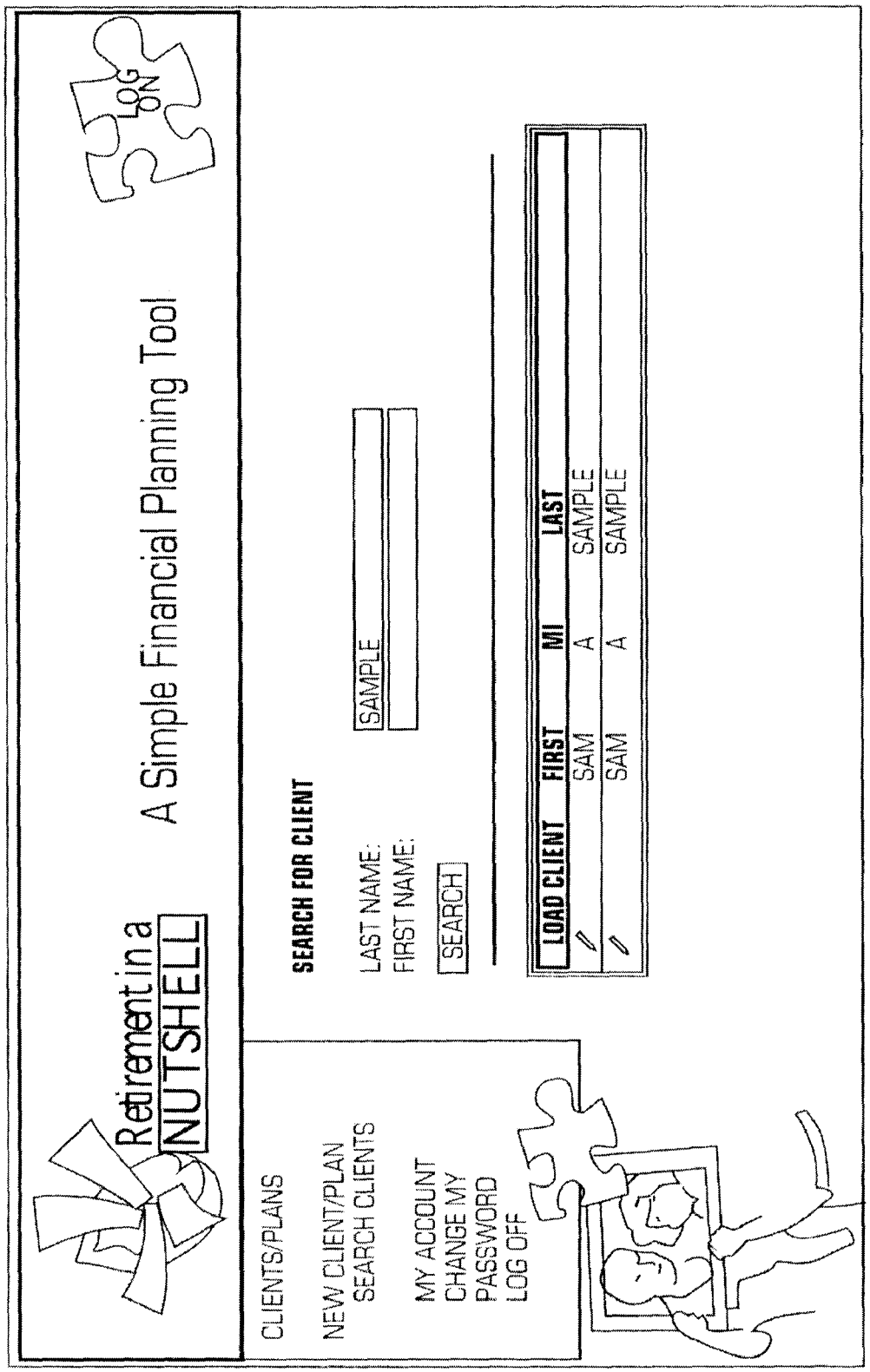
FIG. 1F illustrates an input screen for searching for Existing Client.

Input Screen FIG. 1F—Search for Client. If the user/advisor wants to access the record of a client that has previously been entered into the program, they enter the client's last name or a portion of their name in field 70 and all or a portion of the client's first name in field 71. Any clients that match the entered data will appear in a list below the entry and then the desired client may be selected to enter their specific record.

Figure 2A:
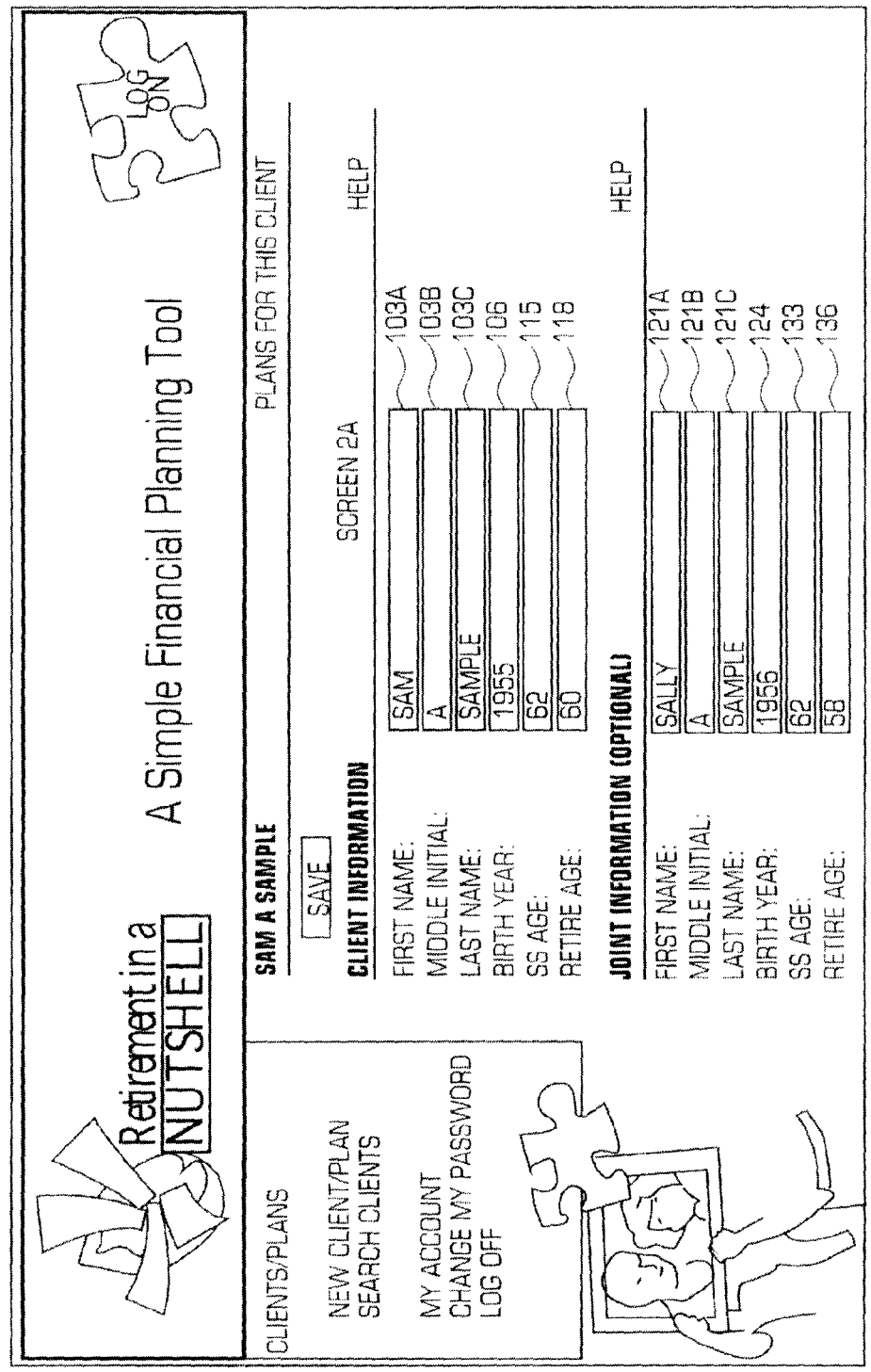
FIG. 2A illustrates an input screen for Entering New Client/Joint Client Information.

Input Screen FIG. 2A—Client and Joint Client. The first entry field on the Client screen is the name of the individual in fields 103A, 103B, and 103C. The individual's birth year is entered in field 106. At field 115, the age at which the individual would like to begin drawing Social Security retirement benefits is entered. At field 118, the age at which the individual would like to retire is entered. This tells the program when to stop any salary payments and begin drawing income from Social Security, pension plans, and retirement investment accounts. If there is a Joint Client/Spouse of the Client (hereinafter "Joint Client" or "Joint Client/Spouse"), their information is entered in entry fields 121, 124, 133, and 136 which are the same as those described above except the information entered relates to the Joint Client/Spouse. The name information from this screen is combined and used to insert the individual's name(s) on the cover page FIG. 3A of the reports and in the header of all other document or report pages. The advisor then selects Save to save the record in the system. The advisor may then select Plans for this Client to move to Input Screen FIG. 2B—Plan.

Figure 2B:
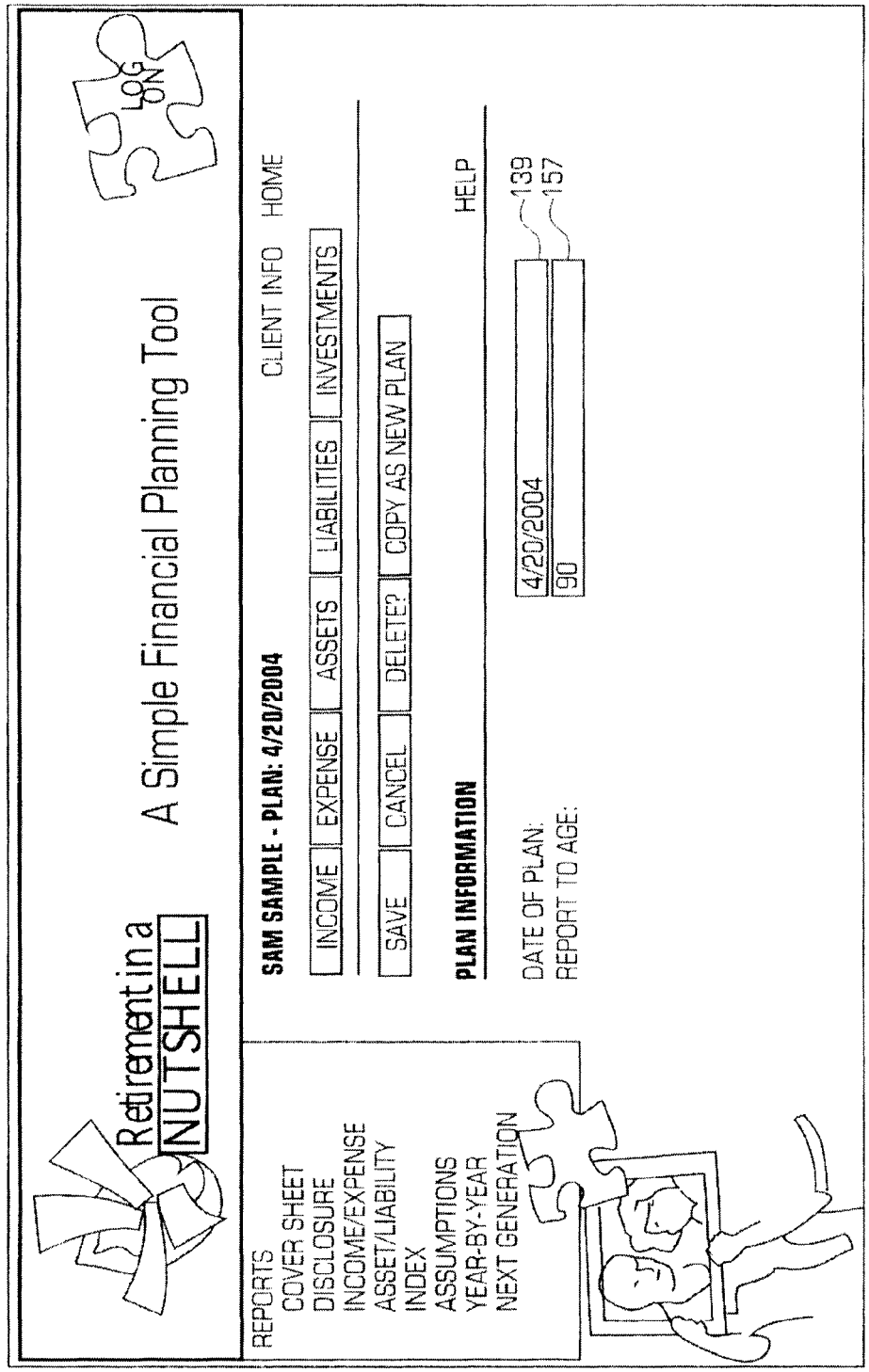
FIG. 2B illustrates an input screen for Entering Plan Date and Plan Default Information.

Input Screen FIG. 2B—Plan. The date the plan is being prepared is entered in field 139. The program automatically enters the current date and another date may be entered manually if desired. Also, several plans may be entered for an individual using different dates and different entry data. Any previously prepared plans will appear in a list and may be selected to load and edit that plan. The age of either the Client or Joint Client/Spouse (whoever first attains that age) that is to be used as the last year to calculate the income, expenses, and cash flow targets by year in FIG. 3F is inserted in field 157.

Input Screen FIG. 2C—Income. The type or source of annual income is selected in field 160. There is a drop down box with seven possible choices available that are Salary, Pension, or Social Security, Alimony, Child Support, Other Taxable, and Other Non-Taxable. Other choices can be added as appropriate. Field 163 has a drop down box that allows one of two choices to be selected, either Client or Joint Client/Spouse depending on which person generated the income. The name or label that is desired to identify the source of income in various reports is inserted in field 166. The program assumes, as a default, that Salary income will begin in the current year and continue until the year before the year either the Client or Joint Client/Spouse chose as the year they will reach retirement age as selected on Input Screen FIG. 2A. The program also assumes, as a default, that Pension or Social Security Income, as adjusted for annual Cost of Living adjustments, will begin in the year selected by the Client or Joint Client for retirement and continue until the last year of the report as selected in the "Report to Age" field 157 of Input Screen FIG. 2B. If a beginning year, other than the default assumptions is desired for a particular income source then the planner selects Show Optional Entries and this information is entered in field 169. If an ending year, other than the default assumptions is desired for a particular income source, it is entered in field 172 after selecting Show Optional Features. The annual gross amount of a particular source of income is entered in field 175. The desired Cost of Living Adjustment (COLA) to be used for each year to adjust the income, from the previous year as a base, is entered as a percentage amount in field 178. Depending on whether a client is currently contributing to Social Security, then Yes or No is selected in field 179. Depending on whether the client is Self Employed, Yes or No is selected in field 180. If a client is currently contributing to a defined benefit plan, the percentage of gross income contributed is entered in field 181. If there are Social Security contributions, the program computes the amount of the contribution based on current regulations and whether the person is self employed or not and subtracts that amount from gross income in all reports showing gross income. If the person is contributing to a defined benefit plan, the program subtracts the percentage indicated in field 181 from gross income for all reports. As many entries as needed may be made to this screen for each source of income generated by the Client or Joint Client/Spouse.

Input Screen FIG. 2D—Inflation, Expenses and Taxes. The inflation rate that the Planner/Advisor wants to use for living expenses is inserted in field 154. The program computes a Client's actual monthly living expenses and that calculation will be described below under the description for the Income and Expense Report, FIG. 3C. The computed monthly living expenses are annualized and appear as the beginning Annual Living Expense amount for the current year in FIG. 3G. That number, in turn is adjusted each year into the future by an assumed inflation rate as inserted in field 154. If the planner or individual preparing the report wishes to over-ride and insert a different number for annual living expenses than the one computed by the program, they may select Show Optional Entries and insert the amount of the monthly expenses in field 182 and the year that they want the over-ride amount to first appear in field 183. The amount entered in field 182 will become the over-ride amount and will appear in FIG. 3G in the year entered in field 183. That number will then be increased by the selected inflation amount each remaining year of the plan. The overall, effective tax rate for Federal Income Taxes, as a percentage of taxable income is inserted into field 190 and the same information for State Income Taxes is inserted in field 193. This will produce an amount for Federal and State Income taxes in the Income and Expense Report, FIG. 3C. The Planner may select Tax Tables to aid them in selecting a percentage to enter. This number would be checked against the Client's actual taxes and the amounts in fields 190 and 193 would be adjusted to produce income taxes that are as close to Client's actual income taxes as possible. If there is a significant change in the client's overall tax rate at some point in the future, they would select Show Optional Entries and the year in which that occurs can be entered in field 194. The adjusted rate for Federal Income Taxes would be entered in field 195 and for State Income Taxes in field 196. The adjusted tax rates will be used for the year entered in field 194 and for all years thereafter.

Figure 2E:
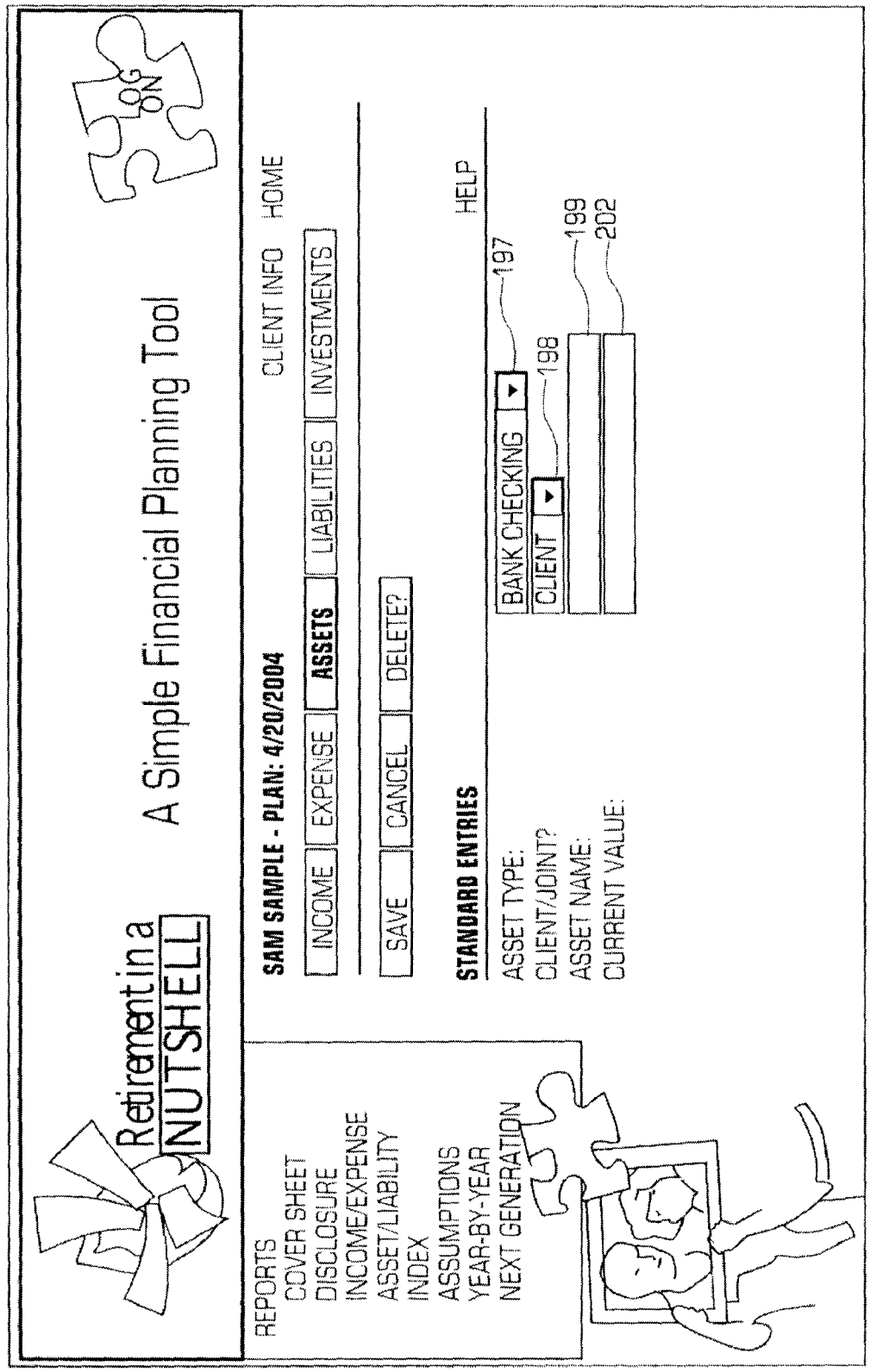
FIG. 2E illustrates an input screen for Entering Assets.

Input Screen FIG. 2E—Assets. A client's various non-investment assets are inserted into the program using this screen. The type of asset is selected in field 197. There is a drop down box with the following choices: Checking; Emergency Savings: Residence: and Vacation Home. In field 198 there is a drop down box where either Client or Joint Client/Spouse may be selected to indicate who owns the asset. If an asset is jointly owned, Client would be selected. A name or label for the asset that is easily recognizable by the Client is inserted into field 199. The estimated current value of the asset is placed in field 202.

Figure 2F:
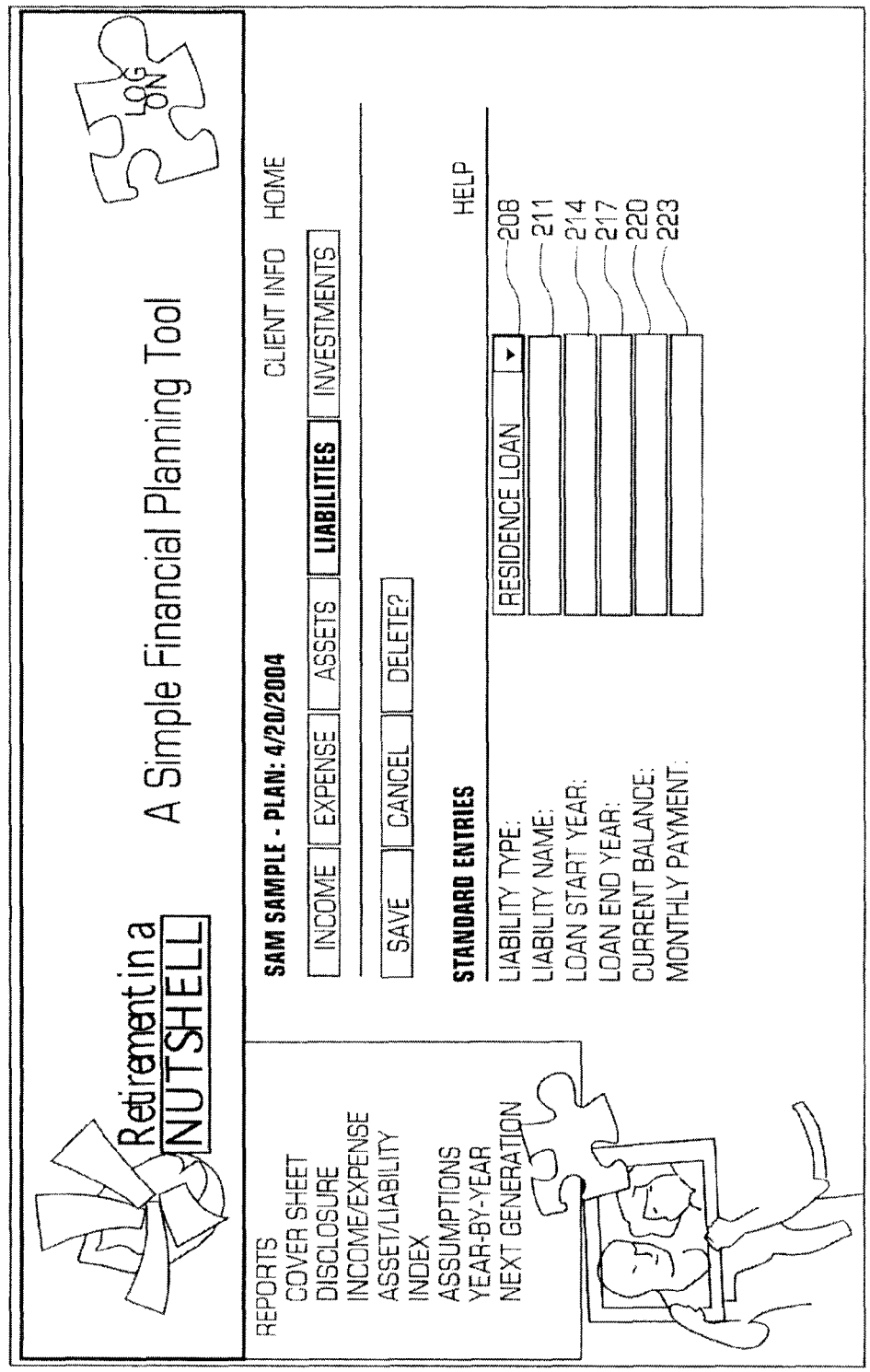
FIG. 2F illustrates an input screen for Entering Liabilities.
Figure 3I:
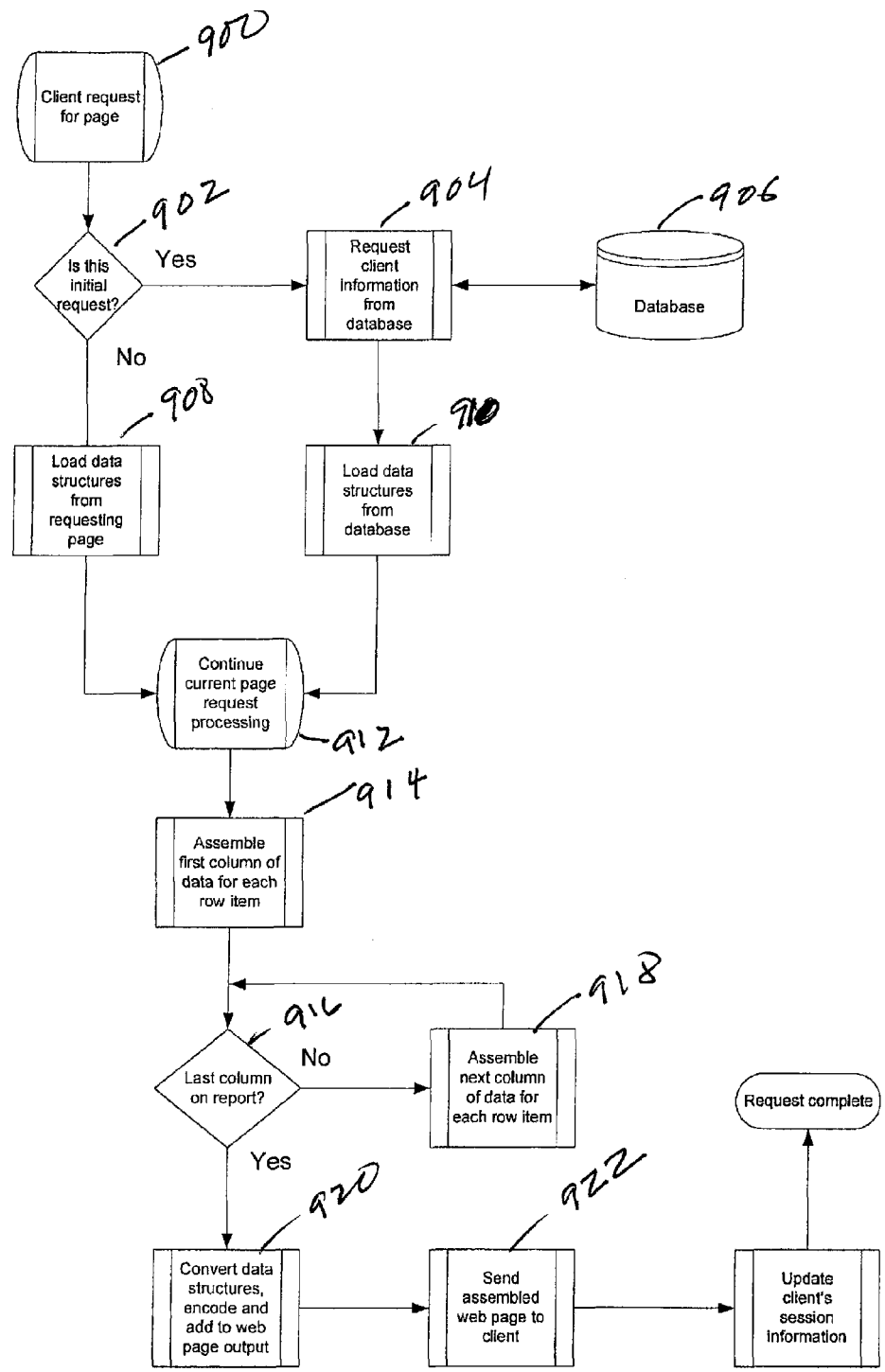
FIG. 3I illustrates the processes a web server uses to present row and column data on a web page.

Input Screen FIG. 2F—Liabilities. Any ongoing liabilities or items of debt are entered into this screen. The type of debt is selected in field 208. There is a drop down box with the following choices: Residence Loan; Investment Real Estate Loan; Credit Card Debt; Other Loan. A name for the liability that is easily recognizable by the Client is inserted into field 211. The start year for the loan is placed in field 214. The ending year for the loan is placed in field 217. The current balance owed on the loan is placed in field 220. The monthly payment amount for the loan is placed in field 223.

Input Screen 2G—Investments. Any investment assets or accounts owned by the Client or Joint Client/Spouse are entered on this screen. The type of asset or account is entered in field 226. There is a drop down box with the following of choices: Company 401K, 403B, etc.; Regular IRA; Roth IRA; Other Retirement; Variable Annuity NQ; Municipal Bonds Fixed Annuity NQ; Brokerage Accounts NQ; Mutual Fund NQ; Investment Real Estate; College; and Other Non Retirement. Some of the choices are marked NQ to designate they are "non-qualified". The NQ designation changes the treatment of additional contributions to a particular account. If the account is NQ then contributions are not deductible for computing taxable income upon which income taxes are computed. The items that are not designated NQ are deductible from income for tax computations. The index to be used for the purpose of calculating future growth and returns on a particular investment is entered in field 229. There is a drop down box with the following choices: Stocks 100%; Bonds 100%; Municipal Bonds 100%; Cash 100%; Zero; Real Estate 100%; Aggressive Growth; Growth; Growth with Income; Income with Growth; Income with Capital Preservation. The planner can select returns for each of the choices based on appropriate market based indexes and historical returns for those indexes. The percentage associated with the particular investment is then used to calculate the compounding return for each year for each investment included in the Cash Flow by Year Report shown in FIG. 3G. The owner of the investment is inserted in field 232. It has a drop down box for choosing either Client or Joint Client/Spouse. This information is used to determine when to stop additional contributions to that account and start taking distributions based on the desired retirement age of the Client or Joint Client/Spouse as entered for the Client or Joint Client/Spouse Input Screen, of FIG. 2A. A name or label for the investment that is easily recognizable by the Client is inserted in field 238. This name or label will be used to identify that investment where it appears throughout any of the reports. The program, by default, assumes investments should first be displayed in the first column for the current year and be displayed every year thereafter. If the Planner wants to have the investment start or end in a year other than the default years, they would select Show Optional Entries and enter the Alternate Start Year or Alternate End Year in fields 241 or 244, respectively. The program, by default, also assumes that additional contributions to a retirement investment will begin in the current year and stop in the year of retirement for the Client or Joint Client/Spouse accordingly. If the individual or planner wishes to over-ride these default assumptions about additions, or the years in which a balance is shown for a particular investment, they may do so by entering a "Start Year" for that investment in field 241 and/or an "End Year" in field 244. The current value of the investment is inserted in field 247. The percentage rate used for calculating withdrawals for a particular account is entered in field 253. The program assumes that contributions will end and withdrawals from a retirement investment will begin in the year of retirement and continue for the rest of the report to age for the Client or Joint Client/Spouse, accordingly. To change the year in which contributions to an investment stop or stop, select Show Optional Entries and enter an "Alternate Withdrawal Start Year" or an "Alternate End Withdrawal" year in fields 254 or 255, respectively.

FIG. 3A—Cover. The cover page of the report is shown in FIG. 3A. The program inserts the names of the Client and Joint Client/Spouse as entered in Input Screen FIG. 2A. The program also enters the name, address, and phone number or the planner or individual preparing the report as entered in Input Screen FIG. 2D.

FIG. 3B—Disclosures. This page can be permanently changed in the program to reflect any legal or regulatory disclosure information required by a planner's broker/dealer or legal advisors. The program can automatically insert the name of the planner, as necessary into the paragraphs as entered in Input Screen FIG. 2D.

FIG. 3C—Income and Expenses. This report displays the Client's and Joint Client/Spouse's current income and expenses as well as any Pension or Social Security Retirement income to be received after retirement. In the header at the top of the page is displayed the names of the Client and Joint Client/Spouse as entered on Input Screen FIG. 2A and the date the plan was prepared from Input Screen FIG. 2B. The program first displays all of the current sources of income as entered in Input Screen 2C. Line 300 displays the label "Income and Expenses". If a Client or Joint Client/Spouse has several sources of the same type of income, for instance salaries from more than one source, then the program will total the similar types of salaries and display the totals in the top portion of the report as shown on lines 301 and 302. Amounts for income from sources such as real estate, investments, or other income are displayed separately as shown on line 303. The program then totals all of the sources of income and displays the result on Line 305. The program takes the total income from line 305, subtracts the total of all the deductible retirement investment additions entered on Input Screen FIG. 2G field 250 multiplied by twelve, and then multiplies the result by the total of the percentages, as a decimal, entered for Federal and State income taxes entered on Input Screen FIG. 2D fields 190 and 193 and displays the resulting amount on Line 306. To arrive at Total After-Tax Income, the program subtracts Line 306 from Line 305 and displays the result on Line 308.

The Total Gross income displayed at Line 305 is displayed again at Line 315. Total Federal and State Income Taxes as displayed on Line 306 is displayed again on Line 318. The total of all the deductible and non-deductible retirement investment additions entered at Input Screen FIG. 2G field 250 is multiplied by twelve and displayed at Line 321. Any College savings additions entered on Input Screen FIG. 2G field 250 for investments designated as College type at field 226 are totaled and then multiplied by twelve and displayed at Line 324. To arrive at Net Actual Annual Expenses Line 318, 321, and 324 are subtracted from Line 315 and the result is displayed at Line 327. To arrive at Net Actual Monthly Expenses, Line 327 is divided by twelve and displayed at Line 330. Next, payments for liabilities which will be amortized and disappear as an expense at some point in the future are deducted to arrive at Net Monthly Living Expenses that represent the Client's current standard of living. The House Payment for Client's mortgage on their Residence as entered on Input Screen FIG. 2F at field 223 is displayed on Line 333. Any payments for mortgages or loans on Investment Properties as entered on Input Screen FIG. 2F at field 223 are totaled and displayed on Line 336. All other liability payments as entered on Input Screen FIG. 2F at field 223 are totaled and displayed on Line 339. To arrive at Net Monthly Living Expenses, Line 333, 336, and 339 are subtracted from Line 330 and displayed on Line 342.

On Line 345, the first name of the Client is entered on Input Screen FIG. 2A field 103A. On Line 348, the retirement age of the Client, as entered on Input Screen FIG. 2A field 118 is displayed. Also displayed on line 348, is the monthly Pension Plan income at retirement as entered on Input Screen FIG. 2C field 175. On line 351, the current monthly estimated income from Social Security as entered on FIG. 2D field 175 is displayed. Also inserted on that line is the Cost of Living Adjustment (COLA) and retirement age for Social Security as entered on Input Screen FIG. 2C field 178 and Input Screen FIG. 2A field 115, respectively. Finally, on Line 351, the estimated amount of Social Security payments at Social Security retirement age, as adjusted for annual COLA increases is displayed.

On Lines 354, 357, and 360, the same information is displayed using the respective input screens and fields for the Joint Client/Spouse.

FIG. 3D—Assets and Liabilities. This report is a basic balance sheet for the Client and Joint Client/Spouse that shows their current net worth and any monthly additions they are making to savings or investments. In the header at the top of the page is displayed the names of the Client and Joint Client/Spouse as entered on Input Screen FIG. 2A and the date the plan was first entered from Input Screen FIG. 2B. At the top of the page under the heading "ASSETS AND LIABILITIES", Line 400, are listed the current market values and monthly additions for all items entered in the program as assets from Input Screen FIG. 2E fields 202 and 205 respectively. The number of lines will vary depending on the number of assets entered into the program.

Below Line 410, with the heading "NON-RETIREMENT INVESTMENTS", are listed all of the investments from Input Screen FIG. 2G that are marked as being a Non-Qualified (NQ) asset in field 226. Displayed for each non-retirement set are the name, type, current market value, and any monthly additions as entered in Input Screen FIG. 2G fields 238, 226, 247 and 250, respectively. Once again, the number of lines will vary based on the number of non-retirement assets entered on Input Screen FIG. 2G.

Below Line 420, with the heading "RETIREMENT INVESTMENTS", are listed all of the investments entered on Input Screen FIG. 2G that are marked as being a retirement asset in field 226. Displayed for each retirement asset are the name, type, current market value, and any monthly additions as entered in Input Screen FIG. 2G fields 238, 226, 247 and 250, respectively. The retirement assets are further grouped under separate headings for the Client and Joint Client/Spouse. The first name of the Client is inserted as entered on Input Screen FIG. 2A field 103A. Under the Client's first name are listed the retirement assets that belong to the Client as designated by the selection chosen on Input Screen FIG. 2G field 232. After all of the Client investments have been listed, the Joint Client/Spouse's first name is inserted from Input Screen FIG. 2C field 121A. Below the Joint Client/Spouse's first name are listed the same information as for the Client regarding retirement investments belonging to the spouse as entered on Input Screen FIG. 2G. The number or lines will vary based on the number of retirement investments entered on Input Screen FIG. 2G.

At Line 428, a total for all of the monthly additions to any of the accounts listed above is displayed under the column titled "Monthly Additions".

Below Line 430, with the heading "LIABILITIES", are listed all of the liabilities entered on Input Screen FIG. 2F. Displayed for each liability are the name, type, and current balance owed for each liability as entered on Input Screen FIG. 2F fields 211, 208, and 220, respectively. The number of lines will vary based on the number of liabilities entered on Input Screen FIG. 2F.

On Line 440, with the heading "NET WORTH", under the column "Current Market Value", the total of ail liabilities subtracted from the total of all assets and investments is displayed.

FIG. 3E—Basis for Setting Investment Targets. In the header at the top of the page is displayed the names of the Client and Joint Client/Spouse as entered on Input Screen FIG. 2A and the date the plan was first entered from Input Screen FIG. 2B. On each of the Lines 500 through 509, the planner or individual preparing the plan may enter the name of the market index and time frame used to represent the particular investment category on that line and also the numerical annual percentage corresponding to the index selected. The indexes, time frames, and percentage returns can be adjusted periodically to update the data to make it more accurate and representative of that category. Below Line 520, with the heading "Blended Accounts and Mutual Funds", on Lines 523 through 535, are listed commonly used investment categories for blended accounts or mutual funds. On each line, a percentage appears under headings for Stocks, Bonds, and Cash that would represent a normal mix of the types of investments typically found in a fund of that category. The percentages entered for Stocks, Bonds, and Cash for each line must total 100%. The program then calculates the blended target return by multiplying the percentage of stocks in the portfolio by the Target Return for Stocks-100% entered above and then doing the same for bonds and cash using their respective percentage weighting in the portfolio and Target Return for their category shown above. The totals for each heading (Stock, Bonds, and Cash) are added together and then divided by 100 to arrive at a blended Target Return that is then displayed under the Target Return heading for that particular category. The "Target Returns" will be used to project values in FIG. 3F for each of the investments entered on Input Screen FIG. 2G and the index entered for each investment in field 229.

FIG. 3F—Worksheet Assumptions. This report is a recap of the assets, investments, and assumptions that will be used for projecting the Client's cash flow in FIG. 3G. In the header at the top of the page is displayed the names of the Client and Joint Client/Spouse as entered on Input Screen FIG. 2A and the date the plan was first entered from Input Screen FIG. 2B. Below Line 600, with the heading "NON-RETIREMENT", are listed the Client's and Joint Client/Spouse's investments entered on Input Screen FIG. 2G that are marked as Non-Qualified (NQ) investments in field 229. For each investment, in columnar format, are shown the Investment Category as entered on Input Screen FIG. 2H field 229, the Current Value as entered on Input Screen FIG. 2G field 247, the Annual Additions as entered on Input Screen FIG. 2G field 250 multiplied by twelve, the Target Rate of Return that corresponds to the Investment Category as shown on Input Screen FIG. 3E, and the Assumed Retirement Withdrawals as entered on Input Screen FIG. 2G field 253. The number of lines will vary based on the number of non-retirement investments entered on Input Screen FIG. 2G.

Below Line 610, with the heading "RETIREMENT" are listed the Client's and Joint Client/Spouse's investments as entered on Input Screen FIG. 2H that are marked as Qualified Retirement Plan types of accounts in field 226. The information listed in columnar form for each investment is the same and from the same entry sources as described for "NON-RETIREMENT" investments above.

On line 620, the Total for the amounts shown in the columns "Current Value" and "Annual Additions" are displayed.

On Line 630, the percentage for Federal and State income taxes as entered on Input Screen FIG. 2D, fields 190 and 193 are totaled and displayed. On Line 640, the Inflation Rate entered on Input Screen FIG. 2B field 154 is displayed. On Lines 650 and 653, are displayed the years until retirement for the Client and the Joint Client/Spouse. This value is arrived at by subtracting the current age of the client, based on their birth year information entered on Input Screen FIG. 2A fields 106 and 124, from the desired age of retirement entered in fields 118 and 136.

FIG. 3G—Income, Expenses, And Cash Flow Targets By Year.

This report is the heart of the program and pulls together all the pieces of a Client's financial resources that impact present and future cash flow and displays each year's income, investments, expenses, and bottom line cash flow in one column for each year. The number of lines on the report will vary based on the number of income sources, investments, and liabilities entered. The number of columns will vary based on the present age of the Client and Joint Client/Spouse and the age selected as the report to age entered on Input Screen FIG. 2B field 157. Color can be used to help the Client easily see like types of the elements that make up cash flow. All income and positive cash flow items can be shown in green. All investment balances can be shown in blue. All expenses and negative cash flow items can be shown in red. The report shows enough detail about the Client's present and future cash flow for them to easily see, on a year by year basis, the financial impact of certain life events. It shows such things as the impact of changing or retiring from employment, how much cash flow can be generated by investment accounts after retirement, the impact on taxes of changes in retirement contributions or changes in cash flow, and the impact on cash flow as debts are amortized and paid off. When the client can see all the pieces and actual numbers that make up cash flow, and they believe the assumptions that went into those numbers are reasonable, they have more trust in the report. This knowledge can reduce their anxiety by letting them see how things will work out at different points in their future. The last page of this report also computes and displays the amount of money the Client would need to put away this year as a lump sum or every year until retirement on an annual or monthly basis to address any cash flow shortfalls after retirement. Also, changes can be made to any of the input fields such as age of retirement, return on an investment, early pay off of a debt, and the impact of those changes will be immediately displayed on this report.

In the header at the top of every page of this report is displayed the names of the Client and Joint Client/Spouse as entered on Input Screen FIG. 2A and the date the plan was first entered from Input Screen FIG. 2B.

Line 700, with the label "Year", displays the current year of the report in the first column and then sets up columns to the right for each year up to the year that corresponds to the report to age entered on Input Screen FIG. 2B field 157. If the Planner wishes to start displaying the income in a year later than the current year, they would enter that year by selecting "Show Optional Entries" and entering the information in field 169. Line 703, with the label "Age" displays, immediately following the label, the first name of the Client and Joint Client/Spouse from Input Screen FIG. 2A fields 103A and 121A separated by a "/". Under each column year the age that the Client or Joint Client/Spouse will turn on their birthday in that year is shown separated by a "/". Below Line 703, are a number of lines for showing various sources of income. The number of lines will vary to accommodate all of the sources of income entered on Input Screen FIG. 2C displaying the label entered in field 166. The amount of income for each source as entered on Input Screen FIG. 2C field 175, is displayed under the column year in which it will first be received by the Client or Joint Client/Spouse based on the appropriate default settings described above, specific years entered on Input Screen FIG. 2C for salaries, pensions, other types of income and age of retirement entered on Input Screen FIG. 2A fields 118 and 136, or age of Social Security Retirement entered on Input Screen FIG. 2A fields 115 and 133. The program will compute any increases in income using the Cost of Living Adjustment (COLA) entered on Input Screen FIG. 2C field 178. The COLA percentage is multiplied against the value in any given column year, added to that value and becomes the amount displayed for the next column year to the right. The program stops displaying income in the appropriate year based on the same input screens and defaults as described for determining the start year above but using the end year entered by selecting "Show Optional Entries" and entering the new end year on Input Screen FIG. 2C field 172.

Line 708 has a label "Total Non-Investment Income" and the program adds all of the income from Salaries, Pensions, and Social Security for each column and displays the result on this line.

Line 710 has a label Investment Real Estate that will only appear if an investment is entered on Screen FIG. 2G and Investment Real Estate is selected as the type of investment in field 226. The value of the real estate as entered in field 247 is entered in the current or designated start year column. If there is more that one investment real estate property entered, they are totaled and the result is entered in the appropriate column year. The value of the investment real estate is then adjusted each year based on the index selected on Screen FIG. 2G field 229. The value of the real estate is multiplied by the percentage of the index selected and that amount is added to the value of the real estate to become the value for the following year. Line 713, labeled "Income" shows the annual income generated by the real estate net of all operating expenses except mortgage payments. The amount displayed is calculated by multiplying the value of the real estate for that year by the percentage entered on Screen FIG. 2G field 253.

Line 720, has the label "Investment Account" with the first name of the Client, as entered on Screen FIG. 2A field 103A, inserted following the label. Immediately below Line 720 are listed all of the investment assets belonging to the client as determined by entering "Client" and "Yes" on Input Screen FIG. 2G fields 232 and 235, respectively. The label for the investment entered on Input Screen FIG. 2G field 238 is displayed. Each retirement investment has two lines with the second line labeled "Income" that displays any withdrawals from the retirement investment for a given year. The first line for a retirement investment displays the value of the account as entered on Input Screen FIG. 2G field 247 in the column for the current year unless another start year is selected in field 241. For the years before the year of retirement of the Client, as determined by the age of retirement entered on Input Screens FIG. 2A field 118, there may be annual contributions added to the account. Those contributions would normally increase over time to keep up with inflation. Accordingly, the added contributions to the retirement investment account as entered on Input Screen FIG. 2G field 250 are increased each year by the inflation rate entered on Input Screen FIG. 2B field 154. The annual added contributions to a particular retirement investment account need not be displayed but are used in calculating the account value for the following year.

The procedure for calculating the retirement investment value for each year up to and including the year of retirement is to multiply the value for a given year by 1 plus the percentage of the appropriate investment index for that investment entered on Input Screen FIG. 2G field 229 and then add the additional contribution for that year, adjusted for inflation, with the result being the account value for the following year.

For the year of retirement and all following years, the second line for a retirement investment displays the annual income distributed from the account. The income is computed by multiplying the account value for that year by the percentage for withdrawals entered in Input Screen FIG. 2G field 253.

For the years after the year of retirement, the retirement investment value for each year is calculated by subtracting the income distributed from the account from the account value for a given year and then multiplying that amount by 1 plus the percentage of the appropriate investment index for that investment entered on Input Screen FIG. 2G field 229. The result is displayed as the retirement account value for the following year.

Line 730, has the label "Investment Account" with the first name of the Joint Client/Spouse, as entered on Screen FIG. 2A field 121A, inserted following the label. Immediately below Line 730 are listed all of the retirement assets belonging to the spouse as determined by entering "Spouse" and "Yes" on Input Screen FIG. 2G fields 232 and 235, respectively. The entries and calculations for the Joint Client/Spouse's retirement investments are the same as those for the Client described above.

Line 735, has the label "Target Account Values". For each column, this line shows the total value of the Retirement Accounts for the Client and the Joint Client/Spouse.

Line 738, has the label "Target Investment Income". For each column, this line shows the total value of the Income from the Retirement Accounts for the Client and the Joint Client/Spouse.

Line 740, has the label "TOTAL INCOME". For each column year, this line displays the total combined value of income from Lines 708, 713, and 738.

Line 745, has the label "Investment Contributions" with the first name of the Client, as entered on Screen FIG. 2A field 103A, inserted following the label. The total value of all monthly contributions to investment accounts as entered on Input Screen FIG. 2G field 250 of Input Screen FIG. 2G fields 232 and 235 is shown in each column for the applicable year. The amount for additional contributions to each retirement account are adjusted and increased for inflation in each year after the column and year in which they first appear. The calculation for the adjustment is to multiply the monthly value of a contribution to a particular retirement account by twelve and then multiply that amount by 1 plus the percentage, expressed as a decimal, entered for inflation on Input Screen FIG. 2B field 154. The result becomes the additional retirement contribution amount for the following year. The contributions for each account need not be displayed in the report but are captured and totaled by the program with the total displayed on Line 745 for the applicable column and year.

Line 750, has the label "Retirement Contributions" with the first name of the Joint Client/Spouse, as entered on Screen FIG. 2A field 121A, inserted following the label. The calculations and amounts displayed are the same as for the Client's accounts but only include those accounts marked Joint Client/Spouse on Input Screen FIG. 2G field 232.

Line 755, has the label "Taxable Income". The amount entered for each column year on this line is calculated by subtracting the deductible Retirement Contributions for both the Client and Joint Client/Spouse from the amount for "Total Income" on Line 740. Deductible Retirement Contributions are those investments that are marked as "Company 401K, 403B, etc.; Regular IRA; or Other Retirement on Input Screen FIG. 2G field 226.

Line 760, has the label "Income Taxes". The amount entered for each column year on this line is calculated by multiplying the total of the percentages entered for Federal and State Income Taxes on Input Screen FIG. 2D fields 190 and 193, expressed as a decimal, by the "Taxable Income" amount as displayed on Line 755.

Line 770, has the label "NET INCOME". The amount displayed for each column year on this line is calculated by subtracting from Line 740 the amounts displayed for retirement contributions on lines 745 and 750 and also subtracting the amount displayed for Income Taxes on line 760.

Line 780, has the label "Annual Living Expenses". Rather than asking the Client to itemize or provide annual living expenses, which is one of the most time consuming, often inaccurate, and tedious steps in preparing many financial plans, this program computes the Client's Annual Living Expenses for them on the theory that after subtracting income taxes and money that is going into savings from gross income, the remainder is spent. To arrive at the Annual Living Expenses that will be required to meet their annual living needs both now and after retirement, the program also backs out those expenses related to debt service or savings that will end at some point in the future. What remains is the amount currently being spent for all other living expenses that will remain all the way through retirement such as food, utilities, insurance, property taxes, entertainment, etc. This is the amount displayed on Line 780. The calculation takes the "Net Income" displayed on Line 770, and subtracts the total of all monthly payments for liabilities entered on Input Screen FIG. 2H field 223 multiplied by twelve. Also subtracted is the total of any monthly additions to College Funding multiplied by twelve, as entered on Input Screen FIG. 2G fields 226 and 250. The resulting Annual Living Expenses amount is displayed under the column for the current year. The amount is also adjusted for inflation by multiplying the amount for each column year by 1 plus the percentage as a decimal entered for inflation on Input Screen FIG. 2D field 154 and displaying the result as the Annual Living Expense for the following column year. It is also possible to override the calculated annual living expenses in a particular year by checking the override box selecting "Show Optional Entries" on Input Screen FIG. 2D and entering the year in field 182 and the amount in field 183. In the year selected, the amount entered in field 182 will be multiplied by twelve and displayed. The same calculation used for inflation above will be applied to all years following the selected year.

On the lines immediately following Line 780, are separate lines for each of the liabilities entered on Input Screen FIG. 2F with the exception of those of the type "Revolving Credit" as entered in field 208 since revolving credit varies from month to month and does not have a set payment and unchanging amortization schedule. The number of lines for liabilities will vary depending on the number of liabilities entered. The label displayed on each line will reflect what was entered on Input Screen FIG. 2F field 211. The amount entered in field 223 for monthly payment is multiplied by twelve and displayed for the column years of and between the loan beginning year and loan end year as entered in fields 214 and 217.

Line 783, has the label "College Savings" and will be displayed if there are items entered on Input Screen FIG. 2G and "College" is selected in field 226. If there is more than one entry of the type "College" the monthly additions entered in field 250 for all entries will be totaled and multiplied by twelve and displayed in the column years for the years of and between the years entered in fields 241 and 244.

Line 785, has the label "Total Annual Expenses". For each column year, this line displays the total of the amounts displayed on Line 780 and any lines below Line 780 and above Line 785 added together.

Line 790, has the label "NET CASH FLOW." For each column year, it displays the result of subtracting Line 785 from Line 770. If the result is positive, it is displayed in the color green. If the result is negative, it is displayed in parentheses and in the color red.

Following the page containing the last column year of FIG. 3G is a last page shown as 3G-10. This page summarizes the Present Value (PV) of shortfalls in two sections: Before Retirement and After Retirement. If there are no cash flow shortfalls, the heading of that section reads "Cash Flow Surplus." If there are any cash flow shortfalls in any year, the heading reads "Contributions Needed to Meet Cash Flow Shortfall".

For any column year before the year of first retirement by the Client or Joint Client/Spouse as determined by the age of retirement entered in Input Screen FIG. 2A fields 118 and 136, where there is a negative "Net Cash Flow" shown on Line 790, the program calculates the Net Present Value (PV), in the current year of the report, for each future year there is a shortfall. For each column year where there is a shortfall, the program calculates the shortfall in three ways: as a single lump sum, as a series of annual payments, and as a series of monthly payments. The formula for the single lump sum is to solve for Present Value (PV) where the default interest rate (i) is the percentage return for a growth investment as calculated on FIG. 3E line 524, the number of periods (n) is the number of years as calculated by subtracting the year in which the shortfall occurs from the current year, and the future value (FV) is the amount of the shortfall for that column year shown on Line 790. The formula for the annual payments is to solve for Payment (PMT) where the default interest rate (i) is the percentage return for a growth investment as calculated on FIG. 3E line 524, the number of periods (n) is the number of years as calculated by subtracting the year in which the shortfall occurs from the current year, and the future value (FV) is the amount of the shortfall for that column year shown on Line 790. The formula for monthly payments is the same as that for annual payments except that the amount for interest rate (i) is divided by twelve and the amount for number of periods (n) is multiplied by twelve. The amounts calculated for each column year before first retirement are totaled for each category; lump sum, annual payments, and monthly payments and the result is shown on Page 3G-10 of FIG. 3G under the heading "Before Retirement". If the Client or Joint Client/Spouse is already retired in the current year, the same formulas and calculations are the same as those used for "Before Retirement" but the results are shown on Page 3G-10 of FIG. 3G under the heading "After Retirement".

If neither the Client nor Joint Client/Spouse is already retired, there is a double calculation done for the year of and the years after first retirement. For each column year of and after first retirement, where there is a Net Cash Flow Shortfall shown on Line 790, a Present Value (PV) is calculated where the default amount for the interest rate (i) is the percentage return for a growth investment as calculated on FIG. 3E line 524, the number of periods (n) is the number of years calculated by subtracting the year of first retirement from the column year in which the shortfall occurs, and future value (FV) is the amount of the shortfall for that column year shown on Line 790. The program then totals and the present values for the year of and the years after first retirement. The second calculation then uses the same formulas and calculations as used for the years before first retirement with the following exception: the future value (FV) used in all the calculations is the resulting number from the first calculation (the total calculated by the program for the present value (PV) of all the shortfalls after the year of first retirement). The resulting lump sum, annual, and monthly amounts are then shown on Page 3G-10 of FIG. 3G of FIG. 3G under the heading "After Retirement".

FIG. 3H—Options For The Next Generation. This is an informational report designed to help clients or individuals assess the financial impact of various options that beneficiaries have for withdrawing retirement account balances after both the Client and Joint Client/Spouse have passed away. Many investment companies now allow the Client or Joint Client/Spouse to specify now how their retirement accounts will be paid out to beneficiaries on their death. They can allow beneficiaries to make the decision after their death or they can put restrictions or instructions on how balances are to be paid out. This report is intended to give them a basis for making the decision when filling out beneficiary forms.

In the header at the top of this report displays the names of the Client and Joint Client/Spouse as entered on Input Screen FIG. 2A and the date the plan was first entered from Input Screen FIG. 2B. Line 810 displays the label "Options for the Next Generation".

Line 813 displays the heading "YEAR" over the first of five columns. Line 815 displays, for examples, five columns with years entered beginning with the year after the year representing the last column year displayed in FIG. 3G. The successive columns display years with the second column displaying the year that is five years after the first column and then each successive column displays the year that is ten years after the previous column. The five columns cover a 35 year period that represents a typical life expectancy for a beneficiary of the retirement accounts.

Line 820 has the label "Option 1—Lump Sum". Under the first column, the amount from the last column year of FIG. 3G line 735 is displayed. Line 823 has the label "Taxes 40%" and under the first column year it displays an amount that is 40% of the amount shown under the first column on line 820. Line 826 has the label "Net lump sum invested at 10% taxable (net 7%)". The amount displayed under the first column year on this line is amount on line 820 minus the amount on line 823. The calculation for the years after the first column year on line 826 is as follows: The amount in the first column is multiplied by 0.06. The resulting amount is subtracted from the amount in the first column and the result of that calculation is multiplied by 1.07 to arrive at the amount for the next year. That calculation is repeated for each year up until the year shown in the last column. The amounts are only shown for the years indicated by the five columns. The years in between are calculated by the program but are not shown.

Line 829 has the label "Annual Withdrawals of 6%/Yr." Under each column year is an amount that is calculated by multiplying the amount on line 826 by 0.06. While the calculation is done by the program for every year between and including the year in the first column and the year in the last column, only the amounts for the five years that correspond to the columns are shown.

Line 832 has the label "Total Withdrawals". On this line under the last column is shown the total of all the withdrawals for all of the years between and including the first and last column year shown in the report.

Line 840 has the label "Option 2—Lump Sum of 25%–Balance over Lifetime–35 Years". Under the first column it displays an amount calculated by multiplying the amount on line 820 by 0.25. Line 843 has the label "Taxes 40%" and under the first column it displays the amount on line 840 multiplied by 0.40. Line 846 has the label "Net after Tax" and under the first column it displays an amount calculated by subtracting line 843 from the amount on line 840.

Line 849 has the label "Balance Invested at 10% Tax Deferred". The first column displays an amount calculated by subtracting the amount on line 840 from the amount on line 820. The calculation for the years after the first column year on line 849 is as follows: The amount in the first column is divided by 35 representing the assumed life expectancy of 35 years used for this report. The resulting amount is subtracted from the amount in the first column and the result of that calculation is multiplied by 1.1 to arrive at the amount for the next year. That calculation is repeated for each year up until the year shown in the last column with the following adjustment in the calculation: The amount for each year is divided by one less than the divisor used for the previous year (for example the amount in the year following the year in the first column is divided by 34 and the next year by 33, etc.). The amounts are only shown for the years indicated by the five columns. The years in between are calculated by the program but are not shown.

Line 852 has the label "Annual Withdrawn using Life Exp." In the first column year on this line is an amount that is calculated by dividing the amount on line 849 by the number 35, representing the 35 years of withdrawals displayed in the report. That calculation is repeated for each year up until the year shown in the last column with the following adjustment in the calculation: The amount for each year is divided by one less than the divisor used for the previous year (for example the amount in the year following the year in the first column is divided by 34 and the next year by 33, etc.). The amounts are only shown for the years indicated by the five columns. The years in between are calculated by the program but are not shown.

Line 855 has the label "Total Withdrawals". On this line under the last column is shown the total of all the withdrawals for all of the years between and including the first and last column year shown in the report.

Line 860 has the label "Option 3—Withdrawals over Lifetime 35 Years". There are no numbers displayed on this line. Line 863 has the label "Balance Invested at 10% Tax Deferred". Under the first column on this line is displayed the same amount as displayed on line 820. The calculation for the years after the first column year on line 863 is as follows: The amount in the first column is divided by 35 representing the assumed life expectancy of 35 years used for this report. The resulting amount is subtracted from the amount in the first column and the result of that calculation is multiplied by 1.1 to arrive at the amount for the next year. That calculation is repeated for each year up until the year shown in the last column with the following adjustment in the calculation: The amount for each year is divided by one less than the divisor used for the previous year (for example the amount in the year following the year in the first column is divided by 34 and the next year by 33, etc.). The amounts are only shown for the years indicated by the five columns. The years in between are calculated by the program but are not shown.

Line 866 has the label "Annual Withdrawn using Life Exp." In the first column year on this line is an amount that is calculated by dividing the amount on line 863 by the number 35, representing the 35 years of withdrawals displayed in the report. That calculation is repeated for each year up until the year shown in the last column with the following adjustment in the calculation: The amount for each year is divided by one less than the divisor used for the previous year (for example the amount in the year following the year in the first column is divided by 34 and the next year by 33, etc.). The amounts are only shown for the years indicated by the five columns. The years in between are calculated by the program but are not shown.

Line 869 has the label "Total Withdrawals". On this line under the last column is shown the total of all the withdrawals for all of the years between and including the first and last column year shown in the report.

It is easier for clients who use languages that move from left to right to visualize and understand information that is presented about time when it is presented from left to right. Also, it is normal for lists of items to be presented from top to bottom, vertically. For this reason, the program can present a report such as that shown in FIG. 3G—INCOME, EXPENSES, AND CASH FLOW BY YEAR, with the columns for years running left to right and the income, asset, and expense items to be listed vertically from top to bottom of the page. While this is relatively easy to do in a spreadsheet application loaded on a particular computer, it is very difficult to do in a web page format. For this reason, many other financial planning programs that are web based, and some that are not by design, present time vertically from top to bottom and items horizontally across the top of the page. This allows the years to extend as far down the page as necessary without carrying numbers over to the next web page. It also creates a problem for those other programs because there is limited space for the description of items horizontally across the top of the page so, rather that show every item or account that makes up cash flow, they are forced to group items into categories and not show the detail that the client can easily identify with.

The reason that spreadsheet types of information are difficult to portray in a web page format is that each web page is separate from all others and stores each packet of information sent by the web site computer to the user's computer and then discontinues the connection to the user's computer. There is no open line to the web page host computer so that the user can reference a previous page. Spreadsheet software generally is loaded on a user's computer or local server which allows the connection to the data to stay open and alive at all times so it is easy to reference cells or data on any page already entered.

This program was able to compensate for these inherent limitations of web pages by performing and storing some calculations before generating the row and column information displayed, and performing other calculations dynamically for other row and column positions. The numbers for the right-most column on each page are stored in the server memory to be referenced by the following web page as starting values for the calculations on that page. Many of the calculations are dependent on previous calculations of the rows above and columns to the left. It becomes more of a continuous calculation rather than calculations based on references to other cells of information as in a spreadsheet.

The following is a description of how the program processes spreadsheet information within a web server environment to accomplish the requirement for left to right columns that go over several pages. Web pages are separate from each other and do not lend themselves to spread sheet types of applications that must roll numbers and calculations over to the next page and subsequent pages left to right. In essence, the instructions for each calculation are done from left to right and top to bottom on each page. This is like one continuous calculation from the top left of the first page to the bottom right of the last page, as explained below. This allows the software to show a line for every retirement account and cash flow item on its own line top to bottom. This allows the client to see the detail on all of their cash flow pieces over time and gives the report believability, or enhanced believability, that is not available with other programs.

Also, the disclosed process does not require the client to provide expense information, which is one of the most onerous things a client has to do in the financial process. It generally requires them to itemize their expenses over several months or years. It is almost impossible to account for miscellaneous expenses that are not regular monthly bills. This can be very time consuming. It can also take a long time for the financial planner to enter the data. By not asking the client for this information and calculating it for them working backwards from gross, the disclosed process saves a huge amount of time and is more accurate. This is really important because the expenses establish the current standard of living that one applies inflation to and set as a cash flow target throughout the rest of life.

This report lists the individual income, investment, and expense items in the leftmost column down the page, ending with the net cash flow. The remaining columns to the right show the years of reporting, starting with the year for the date of the current plan. Each subsequent report page continues from the year where the previous page ended. This continues through final column year that is calculated by using the Report to Age parameter specified in the plan details minus the client's current age.

In all spreadsheet type applications, the calculations performed on a specific piece of data represented by a row and column position are available for dynamic reference in another row and column position. This allows other positions to update their values or calculations when data in other positions are changed. When presenting this type of data in a web page, the ability to reference individual positions dynamically, as in a spreadsheet, is difficult to achieve because web pages loaded into the client computer's web browser become static.

The challenge of dynamically presenting row and column data on a web page was overcome by developing a group of data structures that are created in memory on the server computer and can be accessed and manipulated within the program that builds the web pages in response to a client computer's request for each page. These data structures are based on a multi-dimensional array model. This is necessary because the way that a web page is constructed and presented back to a client computer is left to right, top to bottom. Additionally, the information presented back to the client computer requires that the previous page's information is available for use in the subsequent page being requested.

As a web site that provides a service in which the current user's information is maintained, this program utilizes a feature of the web server software called "sessions." The first request that a client computer makes for the main web page causes the web server to begin a timed session for that specific client. This session maintains a unique identification for the client computer and will be tracked until the specified time period has expired or when the client computer explicitly requests that the session is discontinued. These sessions can also be used to store pieces of information associated the current user. The sequence of the processes that the program uses on the web server is described below and diagrammed in FIG. 3I.

When the web server receives a request 900 for a web page, the software running on the web server executes the specific code to return the web page requested. If the request is an initial request as seen at the Yes output of inquiry 902, information or data is obtained from a database of such information, as at 904, 906. If the request is an initial request the data is returned from the database 906, as at 910; otherwise as at 908. During the processing of creating the output of a web page, the data that is needed to perform row and column calculations is accessed from the in-memory data structures on the web server and appropriate calculations are made as at 912, 914, 916, 918. Some of the data structures continue to hold their values until the client session has ended. Others hold their values only during the execution of the code that creates and presents the requested page.

To see the above with more specificity, when this particular report is requested, all of the necessary client data can be retrieved from the database 906. This includes the name(s), date of birth, retirement age, and social security age for the client and joint client/spouse, if provided in the plan, date of the plan, and the final age for this report. Also part of this data retrieval is all income and investment items, monthly expenses for liability items, and tax percentages.

The information is packaged into the custom data structures, for example during the code execution stage on the server computer. After the requested page is assembled and prepared for transmission back to the client's computer, the custom data structures can be converted into a byte data format and then into a text format that represents the original data in an encoded data format, 920. This is then transmitted as at 922 to the client's computer within the requested web page as, for example, a non-displayed area and can be referenced by the web server when the next page is requested.

This program generally calculates each column, as represented by a year, before moving to the next column. The data for the final row in the first column is available for creating the second column. The data for the final row in the second column is available for the third column. Each of the final calculations performed on a single page's code execution are stored in one of the custom data structures to be used by subsequent pages. This method is employed throughout the remainder of the report.

When a subsequent page is requested, the web server software reads the information available on the current page that is requesting the next page. Each of the custom data structures that was packaged and sent to the previously requested page is retrieved by this program and loaded into a new memory location on the web server computer. This memory location is mapped to the current user's session information. After this program retrieves this data, it is decoded, converted from text into a byte data type, and finally converted into the same data structure that was used for each final calculation on the prior page. This continues until the final page of the report has been reached.

While the invention has been described in terms of a retirement plan, it will be appreciated by those skilled in the art that the teachings herein can be extended to any type of report wherein data over a desired period is desired to be displayed, without departing from the spirit and scope of the invention. This is particularly so with respect to the process by which web pages are assembled left to right and top to bottom, as explained above.

What is claimed is:

1. A computer implemented process for computing a person's living expenses including the steps of:
   storing in a storage register first information representing annual gross income of said person;
   subtracting, by arithmetic logic circuitry, second information representing income taxes paid and money put into savings and investments from said first information to obtain first resultant information;
   subtracting, using arithmetic logic circuitry, third information representing payments the person will make in the current year for liabilities that are amortized from said first resultant information, to arrive at second resultant information representing the living expenses of the person without the person itemizing or estimating current annual expenses.

2. The computer implemented process of claim 1 including the further steps of:
   testing, by arithmetic logic circuitry, information representing whether said person is making payments for liabilities, which liabilities will be amortized, and, if said test indicates said person is making said payments, subtracting, from said first resultant information, fourth information representing said payments over the time periods said payments are made until said liabilities are amortized, to arrive at third resultant information representing said person's living expenses to be sustained during said future time period.

3. A computer implemented process for computing a person's living expenses to be sustained during a future period including the steps of:
   storing in a storage register first information representing annual gross income of said person;
   subtracting, by arithmetic logic circuitry, second information representing income taxes paid and money put into savings and investment programs from said first information to arrive at first resultant information;
   storing in a register said first resultant information;
   subtracting, using arithmetic logic circuitry, third information representing payments said person will make in the current year for liabilities that are amortized from said first resultant information, to arrive at second resultant information; and
   multiplying, by arithmetic logic circuitry, said second resultant information by fourth information representing inflation percentages to arrive at third resultant information representing said person's living expenses to be sustained during a future period without the person itemizing or estimating current annual expenses.

4. The computer implemented process of claim 3 including the further step of displaying said third resultant information in an income and expense report.

5. The computer implemented process of claim 3 including the further step of displaying said third resultant information in an asset and liability report or balance sheet.

6. The computer implemented process of claim 3 including the further steps of:
   storing in a storage register fifth information representing the amount of said person's currently projected annual income during said future period; and
   using arithmetic logic circuitry to subtract said fifth information from said third resultant information and, if the result of said subtracting step indicates that said fifth information is less in value than said third resultant information, calculating how much said person would need to contribute to savings or investments to provide sufficient funds to make said fifth information substantially equal to said third resultant information.

7. The computer implemented process of claim 3 including the further step of calculating a plurality of options that beneficiaries of said person have for withdrawing account balances after the death of said person.

8. The computer implemented process of claim 3 including the further step of displaying said third resultant information in a cash flow year by year report.

9. A computer implemented process for generating a report for computing a person's living expenses including the steps of:
   storing in a storage register first information representing annual gross income of said person;
   subtracting, by arithmetic logic circuitry, second information representing income taxes paid and money put into savings and investments from said first information to obtain first resultant information; and
   subtracting, using arithmetic logic circuitry, third information representing payments the person will make in the current year for liabilities that are amortized from said first resultant information, to arrive at second resultant information representing the living expenses of the person without the person itemizing or estimating current annual expenses.

10. The process of claim 9 wherein the computer implemented process generating said report includes the further steps of:
    testing, by arithmetic logic circuitry, information representing whether said person is amortizing financial obligations and, if said test indicates said person is amortizing financial obligations, subtracting, from said first resultant information, fourth information representing monthly payments of said person for amortizing financial obligations over the time periods said payments are made until said financial obligations are amortized, to arrive at third resultant information representing said person's living expenses to be sustained during said future period.

11. The process of claim 9 wherein the computer implemented process generating said report includes the further steps of:
    testing, by arithmetic logic circuitry, information representing whether said person is making payments for liabilities, which liabilities will be amortized, and, if said test indicates said person is making said payments, subtracting, from said first resultant information, fourth information representing said payments over the time periods said payments are made until said liabilities are amortized, to arrive at third resultant information representing said person's living expenses to be sustained during said future period.

12. A computer implemented process for generating a report for computing a person's living expenses to be sustained during a future time period including the steps of:
    storing in a storage register first information representing annual gross income of said person;
    subtracting, by arithmetic logic circuitry, second information representing income taxes paid and money put into savings and investment programs from said first information to arrive at first resultant information;
    storing in a register said first resultant information;
    subtracting, using arithmetic logic circuitry, third information representing payments the person will make in the current year for liabilities that are amortized from said first resultant information, to arrive at second resultant information; and
    multiplying, by arithmetic logic circuitry, said second resultant information by fourth information representing inflation percentages to arrive at third resultant information representing said person's living expenses to be sustained during a future period without the person itemizing or estimating current annual expenses.

13. A processor readable storage device having processor readable code embodied on said processor readable storage device, said processor readable code for programming one or more processors to perform a process for computing a person's living expenses including the steps of:
    storing in a storage register first information representing annual gross income of said person;
    subtracting, by arithmetic logic circuitry, second information representing income taxes paid and money put into savings and investments from said first information to obtain first resultant information; and
    subtracting, using arithmetic logic circuitry, third information representing payments the person will make in the current year for liabilities that are amortized from said first resultant information, to arrive at second resultant information representing the living expenses to be sustained during said future time period without the person itemizing or estimating current annual expenses.

14. The processor readable storage device of claim 13 including the further steps of:
    testing, by arithmetic logic circuitry, information representing whether said person is amortizing financial obligations and, if said test indicates said person is amortizing financial obligations, subtracting, from said first resultant information, fourth information representing monthly payments of said person for amortizing financial obligations over the time periods said payments are made until said financial obligations are amortized, to arrive at third resultant information representing said person's living expenses to be sustained during said future period.

15. The processor readable storage device of claim 13 including the further steps of:
    testing, by arithmetic logic circuitry, information representing whether said person is making payments for liabilities, which liabilities will be amortized, and, if said test indicates said person is making said payments, subtracting, from said first resultant information, fourth information representing said payments over the time periods said payments are made until said liabilities are amortized, to arrive at third resultant information representing said person's desired annual living expenses to be sustained during said future period.

16. A processor readable storage device having processor readable code embodied on said processor readable storage device, said processor readable code for programming one or more processors to perform a process for computing a person's living expenses to be sustained during a future period including the steps of:
    storing in a storage register first information representing annual gross income of said person;
    subtracting, by arithmetic logic circuitry, second information representing income taxes paid and money put into savings and investment programs from said first information to arrive at first resultant information;
    storing in a register said first resultant information;
    subtracting, using arithmetic logic circuitry, third information representing payments the person will make in the current year for liabilities that are amortized from said first resultant information, to arrive at second resultant information; and multiplying, by arithmetic logic circuitry, said second resultant information by fourth information representing inflation percentages to arrive at third resultant information representing said person's living expenses to be sustained during a future period without a person itemizing or estimating current annual expenses.

17. The processor readable storage device of claim 16 including the further step of displaying said third resultant information in an income and expense report.

18. The processor readable storage device of claim 16 including the further step of displaying said third resultant information in an asset and liability report or balance sheet.

19. The processor readable storage device of claim 16 including the further steps of:

storing in a storage register sixth information representing the amount of said person's currently projected annual income during said future period; and using arithmetic logic circuitry to subtract said fifth information from said third resultant information and, if the result of said subtracting step indicates that said fifth information is less in value than said third resultant information, calculating how much said person would need to contribute to savings or investments to provide sufficient funds to make said fifth information substantially equal to said third resultant information.

20. The processor readable storage device of claim 16 including the further step of calculating a plurality of options that beneficiaries of said person have for withdrawing account balances after the death of said person.

21. The one or more processor readable storage devices of claim 16 including the further step of displaying said third resultant information in a cash flow year by year report.

22. A processor readable storage device having processor readable code embodied on said processor readable storage device, said processor readable code for programming one or more processors to generate a report by a process for computing a person's living expenses to be sustained during a future time period including the steps of:

storing in a storage register first information representing annual gross income of said person; and subtracting, by arithmetic logic circuitry, second information representing income taxes paid and money put into savings and investments from said first information to obtain first resultant information representing said person's living expenses to be sustained during said future period without the person itemizing or estimating current annual expenses.

23. The processor readable storage device of claim 22 wherein the computer implemented process generating said report includes the further steps of:

testing, by arithmetic logic circuitry, information representing whether said person is amortizing financial obligations and, if said test indicates said person is amortizing financial obligations, subtracting, from said first resultant information, third information representing monthly payments of said person for amortizing said financial obligations over the time periods said payments are made until said financial obligations are amortized to arrive at second resultant information representing said person's living expenses to be sustained during said future period.

24. The one or more processor readable storage devices of claim 22 wherein the computer implemented process generating said report includes the further steps of:

testing, by arithmetic logic circuitry, information representing whether said person is making payments for liabilities, which liabilities will be amortized, and, if said test indicates said person is making said payments, subtracting, from said first resultant information, third information representing said payments over the time periods said payments are made until said liabilities are amortized, to arrive at second resultant information representing said person's desired annual living expenses to be sustained during said future period.

25. A processor readable storage device having processor readable code embodied on said processor readable storage device, said processor readable code for programming one or more processors to generate a report by a process for computing a person's living expenses to be sustained during a future time period including the steps of:

storing in a storage register first information representing annual gross income of said person;

subtracting, by arithmetic logic circuitry, second information representing income taxes paid and money put into savings and investment programs from said first information to arrive at first resultant information;

storing in a register said first resultant information;

testing, by arithmetic logic circuitry, information representing whether said person is amortizing financial obligations and, if said test indicates said person is amortizing financial obligations, subtracting, from said first resultant information, third information representing monthly payments of said person for amortizing financial obligations over the time periods said payments are made until said financial obligations are amortized to arrive at second resultant information; and multiplying, by arithmetic logic circuitry, said second resultant information by fourth information representing inflation percentages to arrive at third resultant information representing said person's living expenses to be sustained during a future period without the person itemizing or estimating current annual expenses.

26. A computer implemented process for generating a report for computing a person's living expenses to be sustained during a future time period including the steps of:

storing in a storage register first information representing annual gross income of said person;

subtracting, by arithmetic logic circuitry, second information representing income taxes paid and money put into savings and investment programs from said first information to arrive at first resultant information;

storing in a register said first resultant information;

testing, by arithmetic logic circuitry, information representing whether said person is making payments for liabilities, which liabilities will be amortized, and, if said test indicates said person is making said payments, subtracting, from said first resultant information, third information representing said payments over the time periods said payments are made until said liabilities are amortized, to arrive at second resultant information; and multiplying, by arithmetic logic circuitry, said second resultant information by fifth information representing inflation percentages to arrive at third resultant information representing said person's living expenses to be sustained without the person itemizing or estimating current annual expenses.

27. A processor readable storage device having processor readable code embodied on said processor readable storage device, said processor readable code for programming one or more processors to perform a process for computing a person's living expenses to be sustained during a future period including the steps of:

storing in a storage register first information representing annual gross income of said person;

subtracting, by arithmetic logic circuitry, second information representing income taxes paid and money put into savings and investment programs from said first information to arrive at first resultant information;

storing in a register said first resultant information;

testing, by arithmetic logic circuitry, information representing whether said person is making payments for liabilities, which liabilities will be amortized, and, if said test indicates said person is making said payments, subtracting, from said first resultant information, third information representing said payments over the time periods said payments are made until said liabilities are amortized, to arrive at second resultant information; and multiplying, by arithmetic logic circuitry, said second resultant information by fourth information representing inflation percentages to arrive at third resultant information representing said person's living expenses to be sustained during a future period without the person itemizing or estimating current annual expenses.

28. A processor readable storage device having processor readable code embodied on said processor readable storage device, said processor readable code for programming one or more processors to generate a report by a process for computing a person's living expenses to be sustained during a future time period including the steps of:

storing in a storage register first information representing annual gross income of said person;

subtracting, by arithmetic logic circuitry, second information representing income taxes paid and money put into savings and investment programs from said first information to arrive at first resultant information;

storing in a register said first resultant information;

testing, by arithmetic logic circuitry, information representing whether said person is making payments for liabilities, which liabilities will be amortized, and, if said test indicates said person is making said payments, subtracting, from said first resultant information, third information representing said payments over the time periods said payments are made until said liabilities are amortized, to arrive at second resultant information; and multiplying, by arithmetic logic circuitry, said second resultant information by fourth information representing inflation percentages to arrive at third resultant information representing said person's living expenses to be sustained during a future period without the person itemizing or estimating current annual expenses.

* * * * *